(12) United States Patent
Lin et al.

(10) Patent No.: US 8,891,608 B2
(45) Date of Patent: Nov. 18, 2014

(54) METHOD FOR PERFORMING LOCALIZED MULTIHYPOTHESIS PREDICTION DURING VIDEO CODING OF A CODING UNIT, AND ASSOCIATED APPARATUS

(75) Inventors: Jian-Liang Lin, Yilan County (TW); Yu-Pao Tsai, Kaohsiung (TW); Shaw-Min Lei, New Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 59 days.

(21) Appl. No.: 13/270,249

(22) Filed: Oct. 11, 2011

(65) Prior Publication Data

US 2012/0027097 A1 Feb. 2, 2012

Related U.S. Application Data

(63) Continuation of application No. 13/080,668, filed on Apr. 6, 2011.

(60) Provisional application No. 61/323,948, filed on Apr. 14, 2010.

(51) Int. Cl.
*H04N 7/50* (2006.01)
*H04N 19/56* (2014.01)
*H04N 19/51* (2014.01)

(52) U.S. Cl.
CPC ......... *H04N 7/26872* (2013.01); *H04N 7/2684* (2013.01)
USPC ........................................ 375/240

(58) Field of Classification Search
CPC . H04N 7/50; H04N 7/26244; H04N 7/26271; H04N 7/465; H04N 9/8042; H04N 5/85; H03M 7/30

USPC ........................................... 375/240
See application file for complete search history.

(56) References Cited

U.S. PATENT DOCUMENTS 5,036,393 A * 7/1991 Samad et al. ................. 348/452
5,134,475 A * 7/1992 Johnston et al. ......... 375/240.12
(Continued)

FOREIGN PATENT DOCUMENTS

EP 2109322 A2 10/2009
JP H03184413 A 8/1991
(Continued)

OTHER PUBLICATIONS

Flierl, M.; Wiegand, T.; Girod, B., "Rate-constrained multihypothesis prediction for motion-compensated video compression," Circuits and Systems for Video Technology, I EEE Transactions on, vol.12, No. 11, pp. 957,969, Nov. 2002 doi: 10.1109/TCSVT.2002.805490.*

*Primary Examiner* — Sath V Perungavoor
*Assistant Examiner* — Howard D Brown, Jr.
(74) *Attorney, Agent, or Firm* — Winston Hsu; Scott Margo

(57) ABSTRACT

A method for performing localized multihypothesis prediction during video coding of a coding unit includes processing the coding unit. More particularly, the step of processing the coding unit further includes: obtaining at least two sets of motion information derived from a set of coded units for multihypothesis motion compensation of the coding unit; and utilizing a linear combination of a plurality of pixel values derived from the at least two sets of motion information derived from the set of coded units as a predicted pixel value of the coding unit. An associated apparatus is also provided.

26 Claims, 20 Drawing Sheets

(56) References Cited

U.S. PATENT DOCUMENTS

| | | | |
|---|---|---|---|
| 6,208,760 B1 * | 3/2001 | De Haan et al. | 382/236 |
| 6,438,168 B2 * | 8/2002 | Arye | 375/240.03 |
| 6,807,231 B1 | 10/2004 | Wiegand | |
| 7,184,602 B2 * | 2/2007 | Cohen et al. | 382/243 |
| 7,447,337 B2 * | 11/2008 | Zhang et al. | 382/107 |
| 7,599,438 B2 * | 10/2009 | Holcomb et al. | 375/240.23 |
| 8,085,845 B2 * | 12/2011 | Tourapis et al. | 375/240.16 |
| 8,155,197 B2 | 4/2012 | Nakaishi | |
| 2004/0218827 A1 | 11/2004 | Cohen | |
| 2005/0053143 A1 | 3/2005 | Holcomb | |
| 2006/0088191 A1 | 4/2006 | Zhang | |
| 2007/0047648 A1 | 3/2007 | Tourapis | |
| 2008/0043843 A1 | 2/2008 | Nakaishi | |
| 2008/0240248 A1 | 10/2008 | Lee | |

FOREIGN PATENT DOCUMENTS

| | | |
|---|---|---|
| JP | 2007142521 A | 6/2007 |
| JP | 2007524279 A | 8/2007 |
| JP | 2009246972 A | 10/2009 |
| JP | 201081635 A | 4/2010 |
| JP | 2011517227 A | 5/2011 |
| WO | 2005004491 A1 | 1/2005 |
| WO | 2009126260 A1 | 10/2009 |
| WO | 2010035733 A1 | 4/2010 |

* cited by examiner

METHOD FOR PERFORMING LOCALIZED MULTIHYPOTHESIS PREDICTION DURING VIDEO CODING OF A CODING UNIT, AND ASSOCIATED APPARATUS

CROSS REFERENCE TO RELATED APPLICATIONS

This application is a continuation application and claims the benefit of U.S. non-provisional application Ser. No. 13/080,668, which was filed on Apr. 6, 2011 and entitled "METHOD FOR PERFORMING LOCALIZED MULTIHYPOTHESIS PREDICTION DURING VIDEO CODING OF A CODING UNIT, AND ASSOCIATED APPARATUS" and is incorporated herein by reference. The non-provisional application Ser. No. 13/080,668 claims the benefit of U.S. provisional application No. 61/323,948, which was filed on Apr. 14, 2010 and entitled "MULTIHYPOTHESIS PREDICTION IN VIDEO CODING" and is incorporated herein by reference.

BACKGROUND

The present invention relates to video processing regarding motion compensation, and more particularly, to a method for performing localized multihypothesis prediction during video coding of a coding unit, and to an associated apparatus.

Motion compensation is a technique utilized in encoding and decoding of video data for video compression and decompression. With the aid of motion compensation, a current picture can be represented in terms of some portions of one or more reference pictures, where the reference pictures may be previous in time or even from the future. Typically, when motion compensation is utilized, images can be accurately synthesized from previously transmitted/stored images, and the compression efficiency can be improved. As the coding techniques progresses, the designs regarding newer standards have been introduced. It seems unlikely that conventional motion compensation schemes can always work properly. For example, in some situations, a problem of low coding efficiency may exist. Thus, a novel method is required for enhancing the coding efficiency in video coding.

SUMMARY

It is therefore an objective of the claimed invention to provide a method for performing localized multihypothesis prediction during video coding of a coding unit, and to provide an associated apparatus, in order to solve the above-mentioned problem.

An exemplary embodiment of a method for performing localized multihypothesis prediction during video coding of a coding unit comprises processing the coding unit. More particularly, the step of processing the coding unit further comprises: obtaining at least two sets of motion information derived from a set of coded units for multihypothesis motion compensation of the coding unit; and utilizing a linear combination of a plurality of pixel values derived from the at least two sets of motion information derived from the set of coded units as a predicted pixel value of the coding unit.

An exemplary embodiment of an apparatus for performing localized multihypothesis prediction during video coding of a coding unit comprises a processing circuit arranged to perform video coding on the coding unit, where the processing circuit comprises a preprocessing module and at least one coding module. The preprocessing module is arranged to process the coding unit. More particularly, the preprocessing module obtains at least two sets of motion information derived from a set of coded units for multihypothesis motion compensation of the coding unit, and performs multihypothesis motion compensation on the coding unit according to the at least two sets of motion information, where the preprocessing module utilizes a linear combination of a plurality of pixel values derived from the at least two sets of motion information as a predicted pixel value of the coding unit. In addition, the at least one coding module is arranged to perform video coding on the coding unit based upon the multihypothesis motion compensation performed by the preprocessing module.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
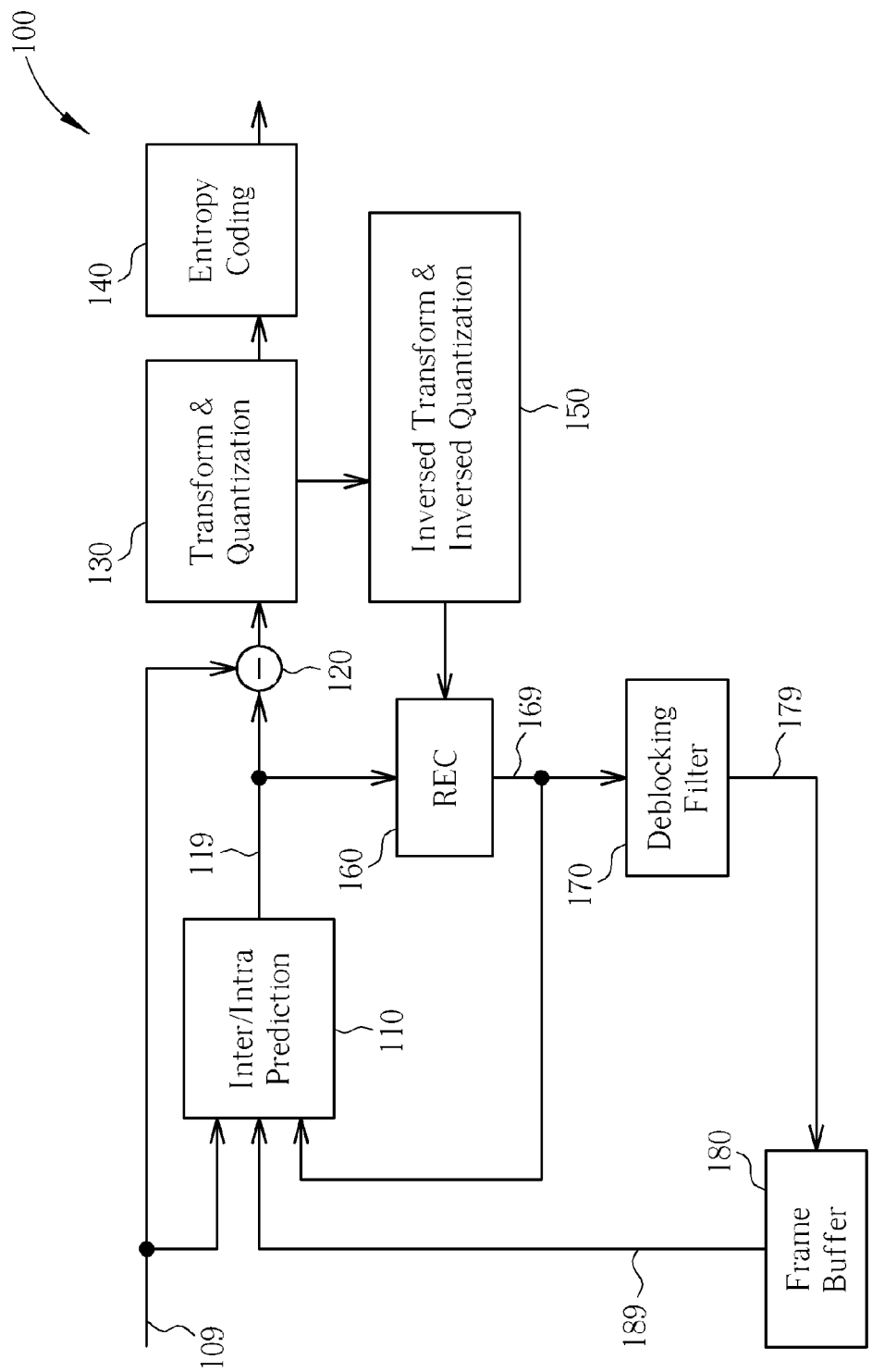
FIG. 1A is a diagram of an apparatus for performing localized multihypothesis prediction during video coding of a coding unit according to a first embodiment of the present invention.
Figure 1B:
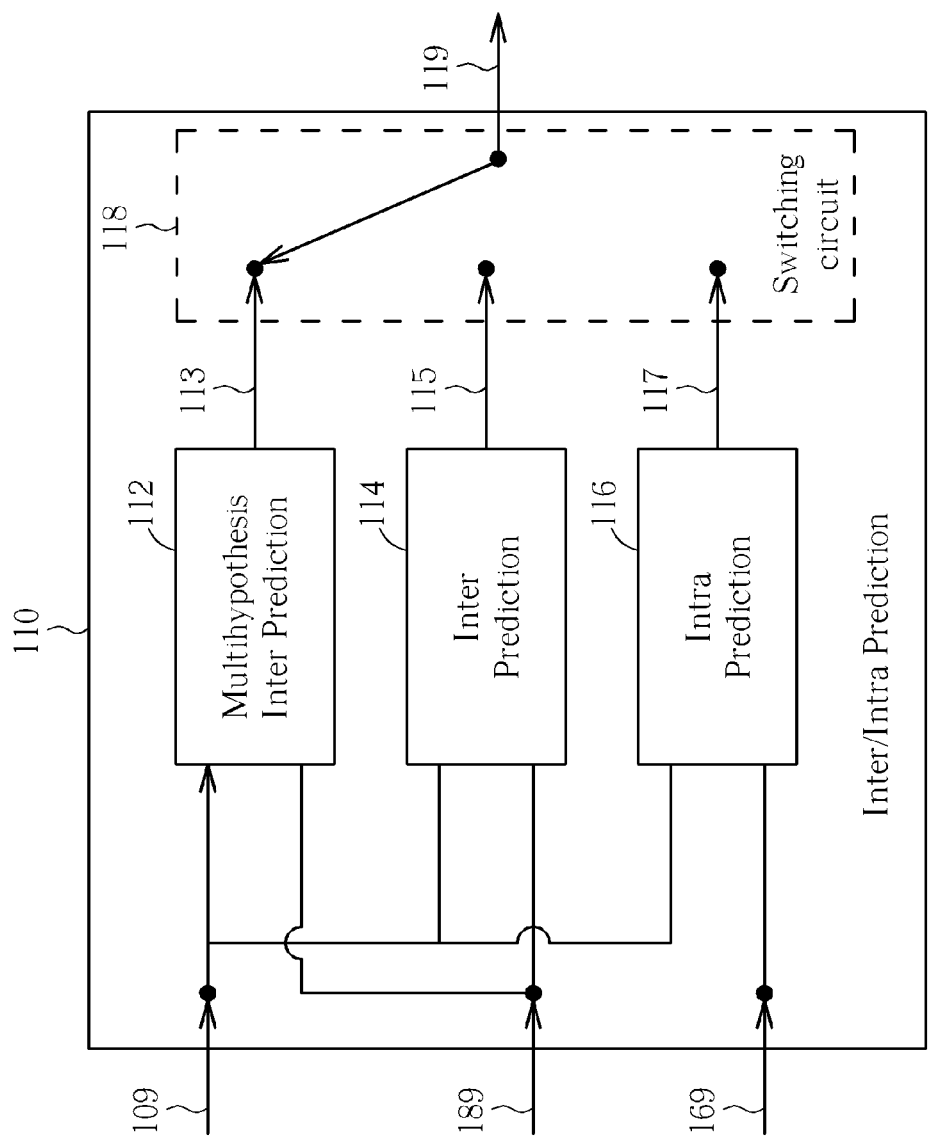
FIG. 1B illustrates the inter/intra prediction module shown in FIG. 1A according to an embodiment of the present invention.

Please refer to FIG. 1A, which illustrates a diagram of an apparatus 100 for performing localized multihypothesis prediction during video coding of a coding unit according to a first embodiment of the present invention. The apparatus 100 comprises an inter/intra prediction module 110 (labeled "Inter/Intra Prediction" in FIG. 1A), an arithmetic unit 120, a transform and quantization module 130 (labeled "Transform & Quantization" in FIG. 1A), an entropy coding circuit 140 (labeled "Entropy Coding" in FIG. 1A), an inversed transform and inversed quantization module 150 (labeled "Inversed Transform & Inversed Quantization" in FIG. 1A), a reconstruction circuit 160 (labeled "REC" in FIG. 1A), a deblocking filter 170, and a frame buffer 180. Referring to FIG. 1B, the inter/intra prediction module 110 mentioned above may comprise a multihypothesis inter prediction circuit 112 (labeled "Multihypothesis Inter Prediction" in FIG. 1B), an inter prediction circuit 114 (labeled "Inter Prediction" in FIG. 1B), an intra prediction circuit 116 (labeled "Intra Prediction" in FIG. 1B), and a switching circuit 118.

According to the embodiment shown in FIG. 1A, the apparatus 100 performs video coding on an original signal 109, and generates an output signal carrying coding results, such as the output of the entropy coding circuit 140. For example, the original signal 109 may represent input video carrying data of the coding unit, and the output of the entropy coding circuit 140 can be an output bitstream (or bit stream). In addition, the inter/intra prediction module 110 is arranged to perform inter/intra prediction, and more particularly, to perform multihypothesis inter prediction, inter prediction, and intra prediction by utilizing the multihypothesis inter prediction circuit 112, the inter prediction circuit 114, and the intra prediction circuit 116 shown in FIG. 1B, respectively.

As shown in FIG. 1A, the arithmetic unit 120 is arranged to perform an arithmetic operation such as a subtraction operation on the original signal 109 (which may represent the input video carrying data of the coding unit, for example) and the prediction signal 119 generated by the inter/intra prediction module 110. In addition, the transform and quantization module 130, the entropy coding circuit 140, the inversed transform and inversed quantization module 150, and the reconstruction circuit 160 are arranged to perform transform and quantization, entropy coding, inversed transform and inversed quantization, and reconstruction operations, respectively. As a result, the reconstruction circuit 160 generates a temporarily reconstructed signal 169 carrying reconstructed results of the reconstruction operations. Additionally, the deblocking filter 170 is arranged to perform deblocking filtering on the reconstructed signal 169, in order to generate a deblocked signal 179 carrying deblocked data for being stored into the frame buffer 180 for the inter prediction of the successive encoding pictures, and the inter/intra prediction module 110 is capable of accessing the temporarily reconstructed signal 169 and the deblocked data of the previous decoded pictures carried by a restored signal 189. This is for illustrative purposes only, and is not meant to be a limitation of the present invention. According to some variations of this embodiment, in a situation where the deblocking filter 170 and the deblocking filtering thereof can be omitted, the reconstructed results carried by the temporarily reconstructed signal 169 can be stored in the frame buffer 180, and the inter/intra prediction module 110 is capable of accessing the temporarily reconstructed signal 169 of the current encoding picture and the reconstructed results of the previous decoded pictures through the restored signal 189.

Referring to FIG. 1B, the multihypothesis inter prediction circuit 112 is arranged to perform multihypothesis inter prediction according to the original signal 109 and the reconstructed results of the previous decoded pictures through the restored signal 189 to generate a multihypothesis inter prediction output 113, the inter prediction circuit 114 is arranged to perform inter prediction according to the original signal 109 and the reconstructed results of the previous decoded pictures through the restored signal 189 to generate an inter prediction output 115, and the intra prediction circuit 116 is arranged to perform intra prediction according to the original signal 109 and the temporarily reconstructed signal 169 to generate an intra prediction output 117, where the switching circuit 118 is arranged to dynamically select one of the multihypothesis inter prediction output 113, the inter prediction output 115, and the intra prediction output 117 as the prediction signal 119 mentioned above.

In practice, at least a portion (e.g. a portion or all) of the apparatus 100 can be implemented by utilizing hardware circuits. For example, the apparatus 100 can be implemented with a processing circuit arranged to perform video coding on the coding unit, where the processing circuit may comprise a preprocessing module comprising the inter/intra prediction module 110, and may further comprise at least one coding module comprising the arithmetic unit 120, the transform and quantization module 130, the entropy coding circuit 140, the inversed transform and inversed quantization module 150, the reconstruction circuit 160, and the deblocking filter 170. More particularly, one or more components of the apparatus 100 can be implemented with digital signal processing techniques. This is for illustrative purposes only, and is not meant to be a limitation of the present invention. According to some variations of this embodiment, at least a portion of the apparatus 100 can be implemented by software and/or firmware. For example, the processing circuit can be a processor executing a plurality of program codes, where the processor executing a first portion of program codes can perform the same or similar operations of the preprocessing module mentioned above, and the processor executing a second portion of program codes can perform the same or similar operations of the coding module mentioned above.

No matter whether at least a portion (e.g. a portion or all) of the apparatus 100 is implemented by utilizing hardware circuits or by utilizing software realization, the apparatus 100 is capable of performing video coding in units of coding units. For example, the coding units can be macroblocks (MBs). In another example, the coding units can be coding units of a size between a predetermined largest coding unit (LCU) and a predetermined smallest coding unit (SCU). The picture is first divided into a plurality of LCUs and each of the LCUs is adaptively split into smaller coding units until leaf coding units are reached. According to this embodiment, the preprocessing module mentioned above is capable of dividing the aforementioned coding unit into a plurality of sub-coding units (e.g. divided by various kinds of partitions, such as square or non-square partitions) and is capable of performing prediction for each of the sub-coding units. More particularly, the preprocessing module can perform inter prediction, intra prediction, or multihypothesis motion compensation on each sub-coding unit. When multihypothesis motion compensation is selected for a specific sub-coding unit, the preprocessing module calculates a linear combination of a plurality of pixel values obtained according to a plurality of other coded units, and utilizes the calculated result as a predicted pixel value of the specific sub-coding unit. The plurality of other coded units may be coded sub-coding units, coded coding units, or a combination thereof. In addition, the aforementioned at least one coding module is arranged to perform video coding on the coding unit based upon the multihypothesis motion compensation performed by the preprocessing module.

Figure 1C:
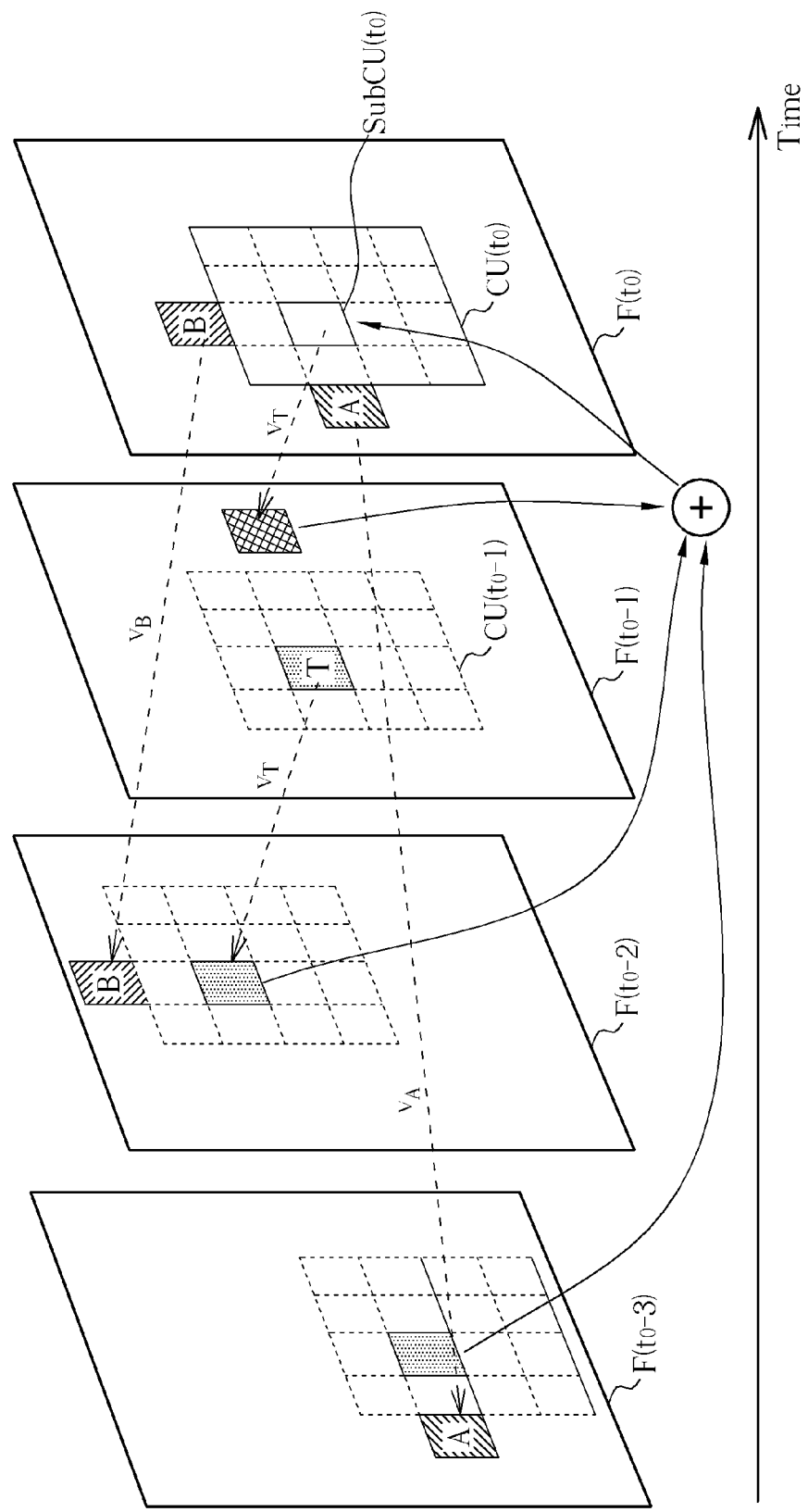
FIG. 1C illustrates exemplary multihypothesis motion compensation operations of the multihypothesis inter prediction circuit shown in FIG. 1B according to an embodiment of the present invention.

FIG. 1C illustrates exemplary multihypothesis motion compensation operations of the inter/intra prediction module 110 shown in FIG. 1A according to an embodiment of the present invention. In this embodiment, the notations $F(t_0-3)$, $F(t_0-2)$, $F(t_0-1)$, and $F(t_0)$ are utilized for representing a portion of a plurality of subsequent frames $\{F(t)\}$, with the frame $F(t_0)$ being the current frame. The current frame $F(t_0)$ may comprise a plurality of coding units $\{CU(t_0)\}$, and a coding unit $CU(t_0)$ may comprise a plurality of sub-coding units $\{SubCU(t_0)\}$. The preprocessing module mentioned above respectively obtains motion information such as motion vectors $\{v_k\}$ from a plurality of other sub-coding/coding units, which means the preprocessing module utilizes the motion vectors of the plurality of other sub-coding/coding units as the motion vectors $\{v_k\}$ for multihypothesis motion compensation of the specific sub-coding unit. According to this embodiment, the preprocessing module can perform multihypothesis motion compensation on the specific sub-coding unit such as the sub-coding unit $SubCU(t_0)$ shown in FIG. 1C according to the plurality of motion vectors $\{v_k\}$.

In general, the preprocessing module calculates a linear combination of a plurality of reference pixel values $\{\Psi_r\}$ obtained by the motion information of the plurality of other sub-coding/coding units. The linear combination is a predicted pixel value $\Psi_p$ of the specific sub-coding unit. For example, the motion information of the first set of coded units comprises one or a combination of motion vector(s), reference frame index(es), and prediction direction(s), and more particularly, comprises some motion vectors that are derived from a single sub-coding unit/coding unit. In another example, the motion information may be motion vector(s), reference frame index(es), prediction direction(s), or any combination of the above. Motion vectors are used as an example of the motion information in the following embodiments. Please note that the linear combination can be a weighted summation of the plurality of reference pixel values, which means the preprocessing module utilizes the weighted summation of the plurality of pixel values as the predicted pixel value of the specific sub-coding unit. For example, in a situation where the specific predicted pixel having the predicted pixel value $\Psi_p$ belongs to the $i^{th}$ sub-coding unit (e.g. the sub-coding unit $SubCU(t_0)$ shown in FIG. 1C) and is located at the position x (e.g. a vector indicating the position, such as a two dimensional vector on the image plane of the current frame $F(t_0)$), the predicted pixel value $\Psi_p$ can be rewritten as $\Psi_p(i, x)$, and the predicted pixel value $\Psi_p(i, x)$ can be express as follows:

$$\Psi_p(i,x)=\Sigma_{k\in K}(h_k(i,x)\Psi_r(x+v_k));$$

where the index k may vary within the set K, with the notation $h_k(i, x)$ representing a weighted parameter associated to the index k. For example, in a situation where the number of possible values of k is greater than one, the summation of the weighted parameters $\{h_k(i, x)\}$ can be equal to one, for simplicity.

As shown in FIG. 1C, the motion vectors $\{v_k\}$ may comprise motion vectors $v_A$ and $v_B$ of sub-coding units A and B of other coding units within the current frame $F(t_0)$, and further comprise a motion vector $v_T$ of a sub-coding unit T of a coding unit $CU(t_0-1)$ within another frame such as the previous frame $F(t_0-1)$. For example, in a situation where the coding units are blocks, the coding unit $CU(t_0-1)$ can be a collocated block with respect to the coding unit $CU(t_0)$. As a result, by applying the weighted parameters $\{h_k(i, x)\}$ to the reference pixel values $\{\Psi_r\}$ obtained by the motion vectors $\{v_k\}$, the preprocessing module can blend/mix the partial images indicated by the motion vectors $\{v_k\}$ such as $v_A$, $v_B$, and $v_T$ in order to generate a weighted summation image, and utilize the weighted summation image as the predicted partial image of the specific sub-coding unit such as the sub-coding unit $SubCU(t_0)$ shown in FIG. 1C. Please refer to FIG. 2 for further details regarding the above-disclosed operations.

Figure 2:
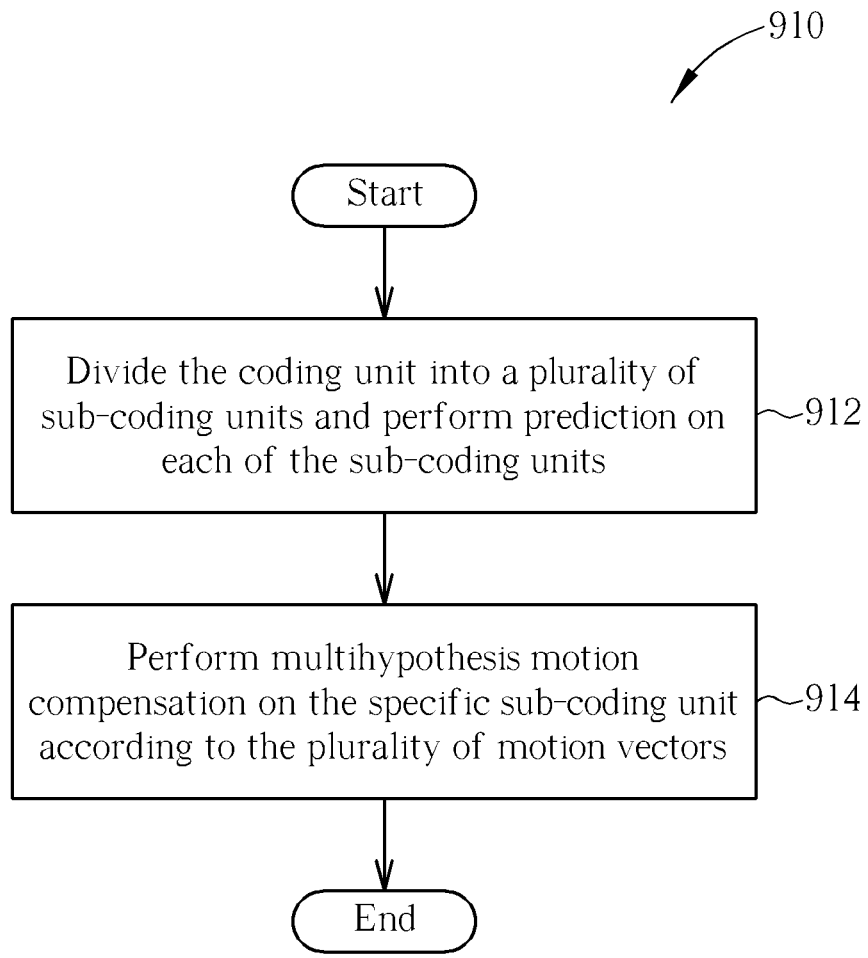
FIG. 2 is a flowchart of a method for performing localized multihypothesis prediction during video coding of a coding unit according to an embodiment of the present invention.

FIG. 2 is a flowchart of a method 910 for performing localized multihypothesis prediction during video coding of a coding unit according to an embodiment of the present invention. The method 910 can be applied to the apparatus 100 shown in FIG. 1A, and more particularly, to the processing circuit mentioned above. The method is described as follows.

Figure 3:
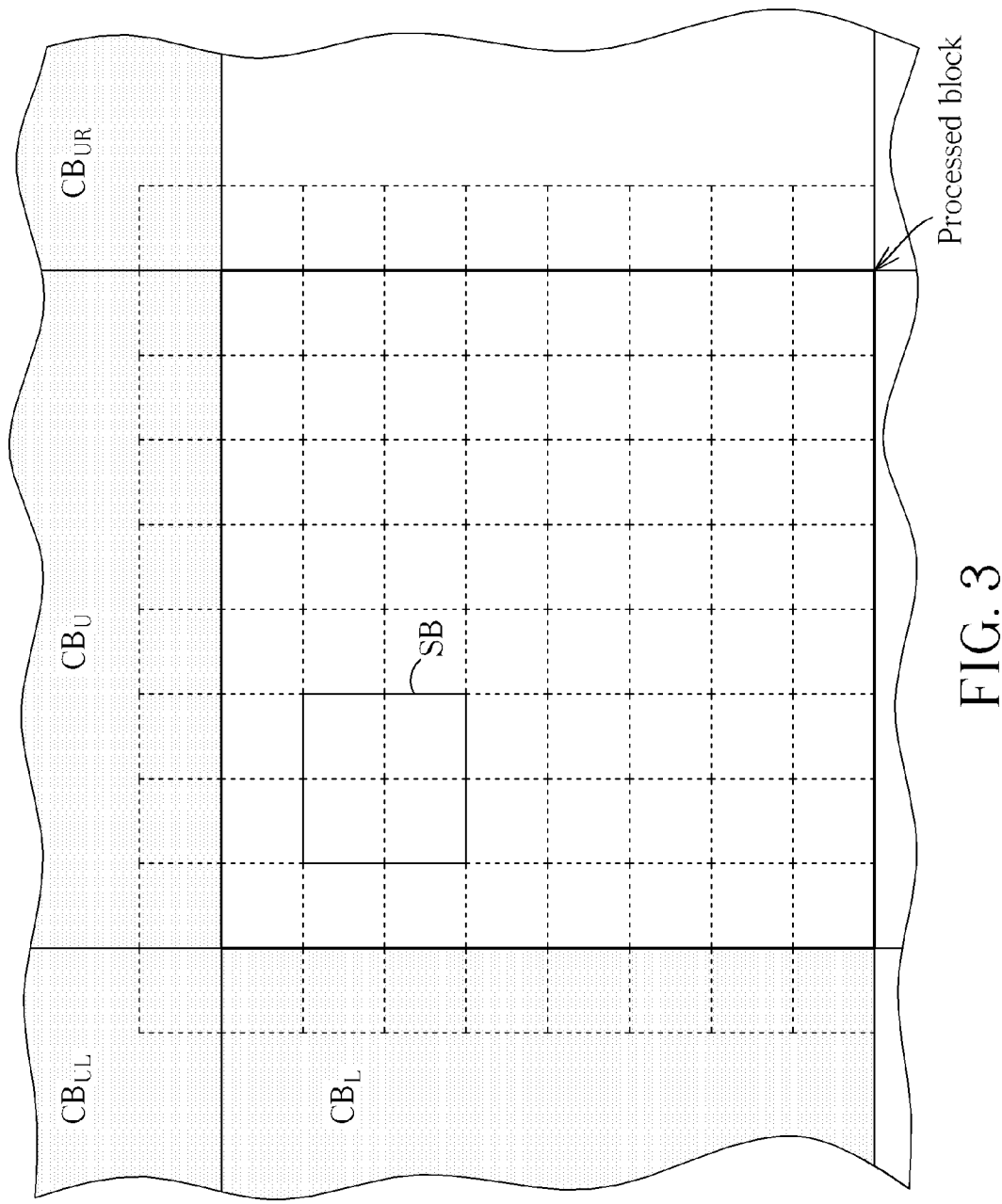
FIG. 3 illustrates exemplary coded blocks involved with the method shown in FIG. 2 according to an embodiment of the present invention.

In Step 912, the preprocessing module mentioned above divides the coding unit $CU(t_0)$ (e.g. the coding unit under consideration) into a plurality of sub-coding units such as the sub-coding units $\{SubCU(t_0)\}$ and performs prediction on each of the sub-coding units $\{SubCU(t_0)\}$. In particular, the preprocessing module obtains motion information, such as the motion vectors $\{v_k\}$ disclosed above, for multihypothesis motion compensation of the specific sub-coding unit $SubCU(t_0)$ of the sub-coding units $\{SubCU(t_0)\}$ from the plurality of other coded units mentioned above (e.g. a plurality of other sub-coding/coding units, which may comprise: other sub-coding unit(s) of the coding unit $CU(t_0)$; sub-coding unit(s) of at least one other coding unit; and/or other coding unit(s)). According to an embodiment of the present invention, such as that shown in FIG. 3, the coding unit $CU(t_0)$ can be a block under processing (labeled "Processed block" in FIG. 3), and the specific sub-coding unit $SubCU(t_0)$ can be a sub-block SB, where the shaded portions illustrated in FIG. 3 may represent at least a portion of the coded units/coded blocks $\{CB\}$. Referring to FIG. 3, the coded blocks $\{CB\}$ may comprise a left coded block $CB_L$, an upper left coded block $CB_{UL}$, an upper coded block $CB_U$, and an upper right coded block $CB_{UR}$. For example, the motion vectors $\{v_k\}$ may comprise motion vectors of at least a portion (e.g. a portion or all) of the coded blocks $\{CB\}$, such as one or more of the coded blocks $CB_L$, $CB_{UL}$, $CB_U$, and $CB_{UR}$.

In Step 914, the aforementioned preprocessing module performs multihypothesis motion compensation on the specific sub-coding unit $SubCU(t_0)$ according to the plurality of motion vectors $\{v_k\}$. In particular, the preprocessing module utilizes a linear combination of a plurality of pixel values of the plurality of other coded units mentioned in Step 912 (e.g. the plurality of other sub-coding/coding units), such as the linear combination of the reference pixel values $\{\Psi_r\}$ of the reference pixels within the plurality of other coded units mentioned above, as the predicted pixel value $\Psi_p$ of the specific sub-coding unit. For example, each coding unit (e.g. the coding unit $CU(t_0)$) can be a block, and more particularly, a block comprising an array of pixels, such as an extended macroblock, a macroblock, or a portion of a macroblock. Thus, a sub-coding unit can be referred to as a sub-block.

According to an embodiment of the present invention, such as that shown in FIG. 3, the aforementioned preprocessing module can perform multihypothesis motion compensation on the block under processing (labeled "Processed block" in FIG. 3) according to the motion vectors $\{v_k\}$ disclosed above, where the preprocessing module can blend/mix the reference pixel values $\{\Psi_r\}$ of the reference pixels within at least a portion (e.g. a portion or all) of the coded blocks $\{CB\}$, such as one or more of the coded blocks $CB_L$, $CB_{UL}$, $CB_U$, and $CB_{UR}$. In this embodiment, the coded blocks $\{CB\}$ can be motion-compensated blocks.

According to this embodiment, the preprocessing module is arranged to process each of the sub-coding units mentioned in Step 912. For example, the preprocessing module obtains motion information of a first set of coded units for multihypothesis motion compensation of a first sub-coding unit of the sub-coding units mentioned in Step 912, such as the specific sub-coding unit $SubCU(t_0)$, and performs multihypothesis motion compensation on the first sub-coding unit such as the specific sub-coding unit according to the motion information. More particularly, the preprocessing module utilizes a linear combination of a plurality of pixel values derived from the motion information of the first set of coded units as a predicted pixel value of the first sub-coding unit such as the specific sub-coding unit. In addition, the aforementioned at least one coding module is arranged to perform video coding on the coding unit based upon the multihypothesis motion compensation performed by the preprocessing module. Additionally, the preprocessing module derives a predicted pixel value of another sub-coding unit in the coding unit, such as a second sub-coding unit of the sub-coding units mentioned in Step 912, by utilizing motion information of a second set of coded units, where the second sub-coding unit differs from the first sub-coding unit.

With regard to the first sub-coding unit, the first set of coded units may comprise: other sub-coding unit(s) of the coding unit $CU(t_0)$ (i.e. sub-coding unit(s) of the coding unit $CU(t_0)$ except for the first sub-coding unit); sub-coding unit(s) of at least one other coding unit (i.e. sub-coding unit(s) of at least one coding unit that differs from the coding unit $CU(t_0)$); and/or other coding unit(s), such as one or more coding units that differ from the coding unit $CU(t_0)$. In addition, with regard to the second sub-coding unit, the second set of coded units may comprise: other sub-coding unit(s) of the coding unit $CU(t_0)$ (i.e. sub-coding unit(s) of the coding unit $CU(t_0)$ except for the second sub-coding unit); sub-coding unit(s) of at least one other coding unit (i.e. sub-coding unit(s) of at least one coding unit that differs from the coding unit $CU(t_0)$); and/or other coding unit(s), such as one or more coding units that differ from the coding unit $CU(t_0)$. Please note that the second set of coded units comprises at least one coded unit that is not in the first set of coded units. This is for illustrative purposes only, and is not meant to be a limitation of the present invention. According to some variations of this embodiment, the second set of coded units and the first set of coded units can be the same set of coded units. However, the preprocessing module utilizes different linear combinations of the plurality of pixel values derived from the motion information of the same set of coded units as the respective predicted pixel values of the first sub-coding unit and the second sub-coding unit, respectively. For example, the preprocessing module utilizes a first linear combination corresponding to a first set of weighted parameters for the plurality of pixel values as the predicted pixel value of the first sub-coding unit, and utilizes a second linear combination corresponding to a second set of weighted parameters for the plurality of pixel values as the predicted pixel value of the second sub-coding unit. In another example, the preprocessing module utilizes a first weighted summation of the plurality of pixel values derived from the motion information of the first set of coded units as the predicted pixel value of the first sub-coding unit such as the specific sub-coding unit, and derives the predicted pixel value of the second sub-coding unit by utilizing a second weighted summation of the pixel values derived from the motion information of the same set of coded units (i.e. the first set of coded units), where the first weighted summation is different from the second weighted summation.

In some embodiments such as variations of the embodiment shown in FIG. 3, each of the other coded units mentioned in Step 912 is a coded sub-coding/coding unit. For example, in a portion of these variations, the plurality of other coded units mentioned in Step 912 comprises at least one spatially coded sub-coding/coding unit (e.g. one or more of the coded blocks $\{CB\}$ in the current frame $F(t_0)$, or one or more coded sub-blocks within the block under processing or within the coded block) and/or at least one temporally coded sub-coding/coding unit (e.g. one or more coded sub-blocks/blocks in another frame that differs from the current frame $F(t_0)$). In another example, in a portion of these variations, each of the other coded units mentioned in Step 912 is a motion-compensated sub-coding/coding unit. According to some of these variations, the motion vectors $\{v_k\}$ can be obtained from motion estimation.

Figure 4:
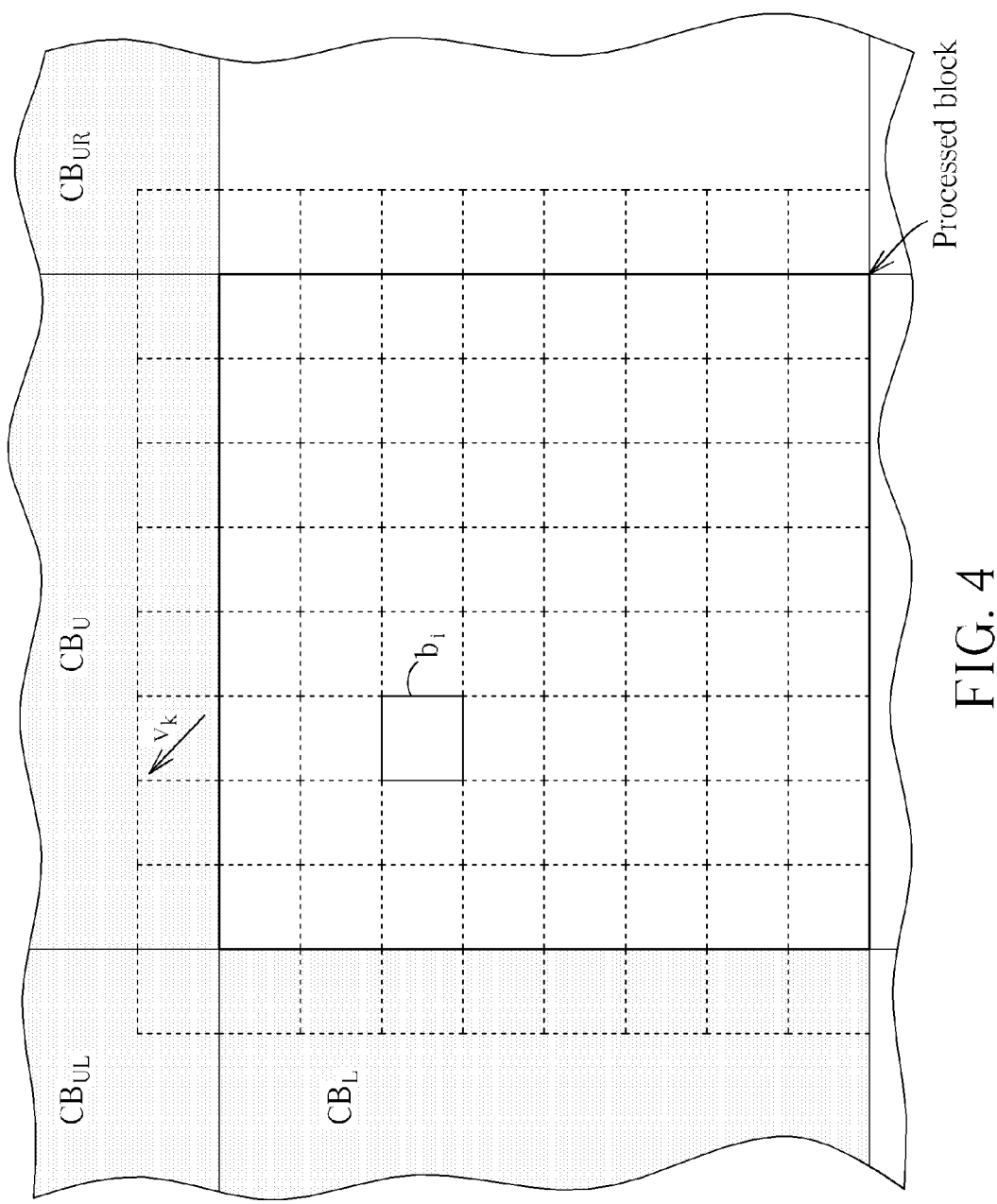
FIG. 4 illustrates some implementation details involved with the method shown in FIG. 2 according to an embodiment of the present invention.

FIG. 4 illustrates some implementation details involved with the method 910 shown in FIG. 2 according to an embodiment of the present invention. According to this embodiment, the preprocessing module can utilize a weighted summation of the plurality of pixel values mentioned in Step 914 (e.g. $\Sigma_{k \in K}(h_k(i, x)\Psi_r(x+v_k))$ in this embodiment) as the predicted pixel value $\Psi_p$ of the specific sub-coding unit such as the $i^{th}$ sub-block $b_i$ shown in FIG. 4. For better comprehension, the coded blocks $CB_L$, $CB_{UL}$, $CB_U$, and $CB_{UR}$ can be the same as those shown in FIG. 3, respectively. For example, the reference pixel values $\{\Psi_r\}$ of the reference pixels for calculating the predicted pixel value $\Psi_p$ can be obtained from one or more of the coded blocks $CB_L$, $CB_{UL}$, $CB_U$, and $CB_{UR}$, and the plurality of motion vectors $\{v_k\}$ may comprise one or more of the respective motion vectors $v_L$, $v_{UL}$, $v_U$, and $v_{UR}$ of the coded blocks $CB_L$, $CB_{UL}$, $CB_U$, and $CB_{UR}$.

More particularly, for each sub-block such as the $i^{th}$ sub-block $b_i$ shown in FIG. 4, a predicted pixel value such as the predicted pixel value $\Psi_p(i, x)$ can be derived from blending/mixing the reference pixel values $\{\Psi_r\}$ of some reference pixels within the coded blocks $\{CB\}$, and can still be expressed as follows:

$$\Psi_p(i,x) = \Sigma_{k \in K}(h_k(i,x)\Psi_r(x+v_k));$$

where the index k may vary within the set K, and the notations $v_k$ and $h_k(i, x)$ can be utilized for representing the $k^{th}$ reference motion vector and the associated weighted parameter, respectively. For example, $b_i \in B_m$, and the notation $B_m$ represents the set of sub-blocks of the block under processing (labeled "Processed block" in FIG. 4). As shown in FIG. 4, an exemplary motion vector $v_k$ of the motion vectors $\{v_k\}$ is illustrated within the coded block $CB_U$, which means the motion vectors $\{v_k\}$ comprises the motion vector $v_U$ of the coded block $CB_U$ in this situation.

In an embodiment, such as a variation of the embodiment shown in FIG. 4, the preprocessing module can perform optimum Wiener filtering on the plurality of pixel values such as the reference pixel values $\{\Psi_r\}$ with respect to a real pixel value $\Psi_{REAL}(i, x)$ of the current pixel under consideration, in order to adjust respective weighted parameters $\{h_k(i, x)\}$ for the plurality of pixel values such as the reference pixel values {Ψ$_r$} and to generate the weighted summation (i.e. Σ$_{k \in K}$(h$_k$(i, x)Ψ$_r$(x+v$_k$)) in this variation). For example, the weighted parameters {h$_k$(i, x)} can be obtained by utilizing an optimum Wiener filter within the preprocessing module as follows:

$$(h_0^*, \ldots, h_K^*) = \arg\min |Ψ_{REAL}(i,x) - Σ_{k \in K}(h_k(i,x)Ψ_r(x+v_k))|;$$

which means the weighted parameters {h$_k$(i, x)} can be obtained by searching for a set of (h$_0$*, . . . , h$_K$*) corresponding to a minimum value of |Ψ$_{REAL}$(i, x)−Σ$_{k \in K}$(h$_k$(i, x)Ψ$_r$(x+v$_k$))| during the optimum Wiener filtering performed by the preprocessing module. This is for illustrative purposes only, and is not meant to be a limitation of the present invention. According to a variation of the embodiment shown in FIG. 4, the preprocessing module can determine the respective weighted parameters {h$_k$(i, x)} for the plurality of pixel values according to contents of at least one neighboring coding unit, such as the contents of one or more of the coded blocks CB$_L$, CB$_{UL}$, CB$_U$, and CB$_{UR}$, in order to generate the weighted summation (i.e. Σ$_{k \in K}$(h$_k$(i, x)Ψ$_r$(x+v$_k$)) in this variation). According to another variation of the embodiment shown in FIG. 4, the preprocessing module can determine the respective weighted parameters {h$_k$(i, x)} for the plurality of pixel values according to contents of the plurality of other coded units mentioned in Step 912 (e.g. the first set of coded units), in order to generate the weighted summation (i.e. Σ$_{k \in K}$(h$_k$(i, x)Ψ$_r$(x+v$_k$)) in this variation).

In some other embodiments, such as some variations of the embodiment shown in FIG. 4, the preprocessing module can determine the respective weighted parameters {h$_k$(i, x)} for the plurality of pixel values by offline training or by online training, in order to generate the weighted summation (i.e. Σ$_{k \in K}$(h$_k$(i, x)Ψ$_r$(x+v$_k$)) in these variations). According to another variation of the embodiment shown in FIG. 4, the preprocessing module can utilize an average of the plurality of pixel values as the predicted pixel value of the specific sub-coding unit, which means any two of the weighted parameters {h$_k$(i, x)} are equal to each other. More particularly, in this variation, each of the weighted parameters {h$_k$(i, x)} is equal to 1/n(K), where the n(K) represents the number of possible values of k within the set K.

FIGS. 5A-5D illustrate some implementation details of multihypothesis prediction that are involved with the method 910 shown in FIG. 2 according to different embodiments of the present invention, where the linear combination mentioned in Step 914 can be regarded as the weighted summation (i.e. Σ$_{k \in K}$(h$_k$(i, x)Ψ$_r$(x+v$_k$)) in these embodiments). For better comprehension, the coded blocks CB$_L$, CB$_{UL}$, CB$_U$, and CB$_{UR}$ can be the same as those shown in FIG. 3, respectively. In addition, the i$^{th}$ sub-block b$_i$ is illustrated as an example of the specific sub-coding unit SubCU(t$_0$).

Figure 5A:
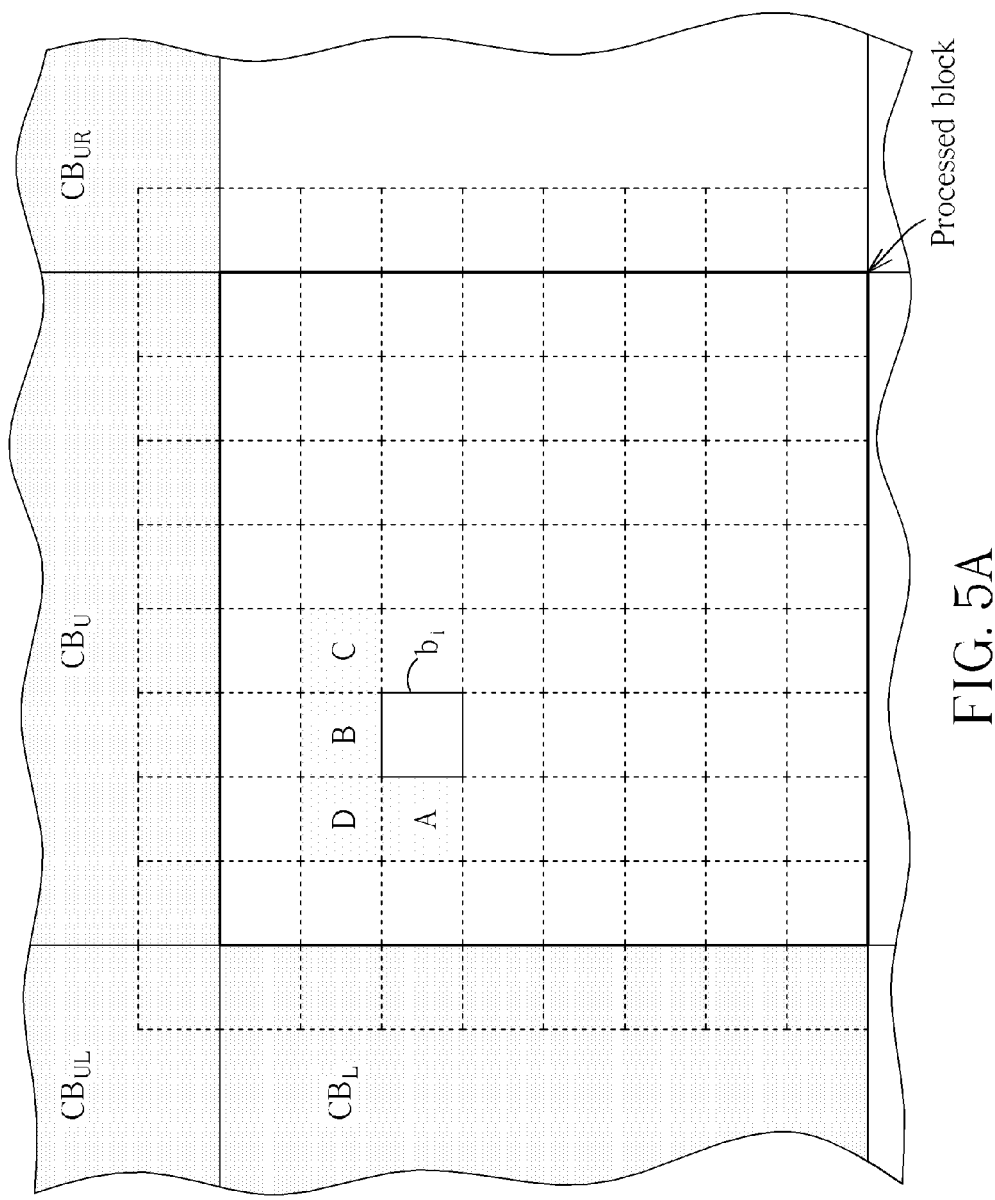
FIGS. 5A-5D illustrate some implementation details of multihypothesis prediction that are involved with the method shown in FIG. 2 according to different embodiments of the present invention.

Referring to FIG. 5A, the sub-coding units A, B, C, and D belong to the block under processing (labeled "Processed block" in FIG. 5A) or other coded units (such as CB$_{UL}$, CB$_U$, CB$_{UR}$, CB$_L$). More particularly, with regard to the i$^{th}$ sub-block b$_i$ shown in FIG. 5A, the sub-coding unit A is the left adjacent sub-coding unit, the sub-coding unit B is the upper adjacent sub-coding unit, the sub-coding unit C is the upper right adjacent sub-coding unit, and the sub-coding unit D is the upper left adjacent sub-coding unit. In this embodiment, the motion vectors {v$_k$} can be obtained from the sub-coding units A, B, C, and/or D shown in FIG. 5A, and therefore, may include the respective motion vectors v$_A$, v$_B$, v$_C$, and/or v$_D$ thereof. For example, the motion vectors {v$_k$} may include all of the motion vectors v$_A$, v$_B$, v$_C$, and v$_D$ of the sub-coding units A, B, C, and D. In another example, the motion vectors {v$_k$} may include the motion vectors v$_A$, v$_B$, and v$_C$ if the sub-coding unit C for the specific sub-coding unit such as the i$^{th}$ sub-block b$_i$ exists. In another example, the motion vectors {v$_k$} may include the motion vectors v$_A$, v$_B$, and v$_D$ if the sub-coding unit C for the sub-coding unit C for the specific sub-coding unit such as the i$^{th}$ sub-block b$_i$ does not exist.

Thus, the linear combination mentioned in Step 914 can be the above-disclosed weighted summation Σ$_{k \in K}$(h$_k$(i, x)Ψ$_r$(x+v$_k$)) with the motion vectors {v$_k$} including the motion vectors v$_A$, v$_B$, v$_C$, and/or v$_D$. For brevity, the predicted pixel value Ψ$_p$ can be expressed as follows:

$$Ψ_p = \text{Weighted\_Sum}(Ψ_r(v_A), Ψ_r(v_B), Ψ_r(v_C), \text{and/or } Ψ_r(v_D));$$

where the notation Weighted_Sum represents the weighted summation in the above-disclosed situation.

According to a variation of the embodiment shown in FIG. 5A, the preprocessing module utilizes an average of the plurality of pixel values as the predicted pixel value of the specific sub-coding unit, which means the linear combination mentioned in Step 914 can be regarded as the average. In this situation, any two of the weighted parameters {h$_k$(i, x)} are equal to each other. For brevity, the predicted pixel value Ψ$_p$ can be expressed as follows:

$$Ψ_p = \text{Average}(Ψ_r(v_A), Ψ_r(v_B), Ψ_r(v_C), \text{and/or } Ψ_r(v_D));$$

where the notation Average represents the average in this situation. Similar descriptions are not repeated in detail for this variation.

Figure 5B:
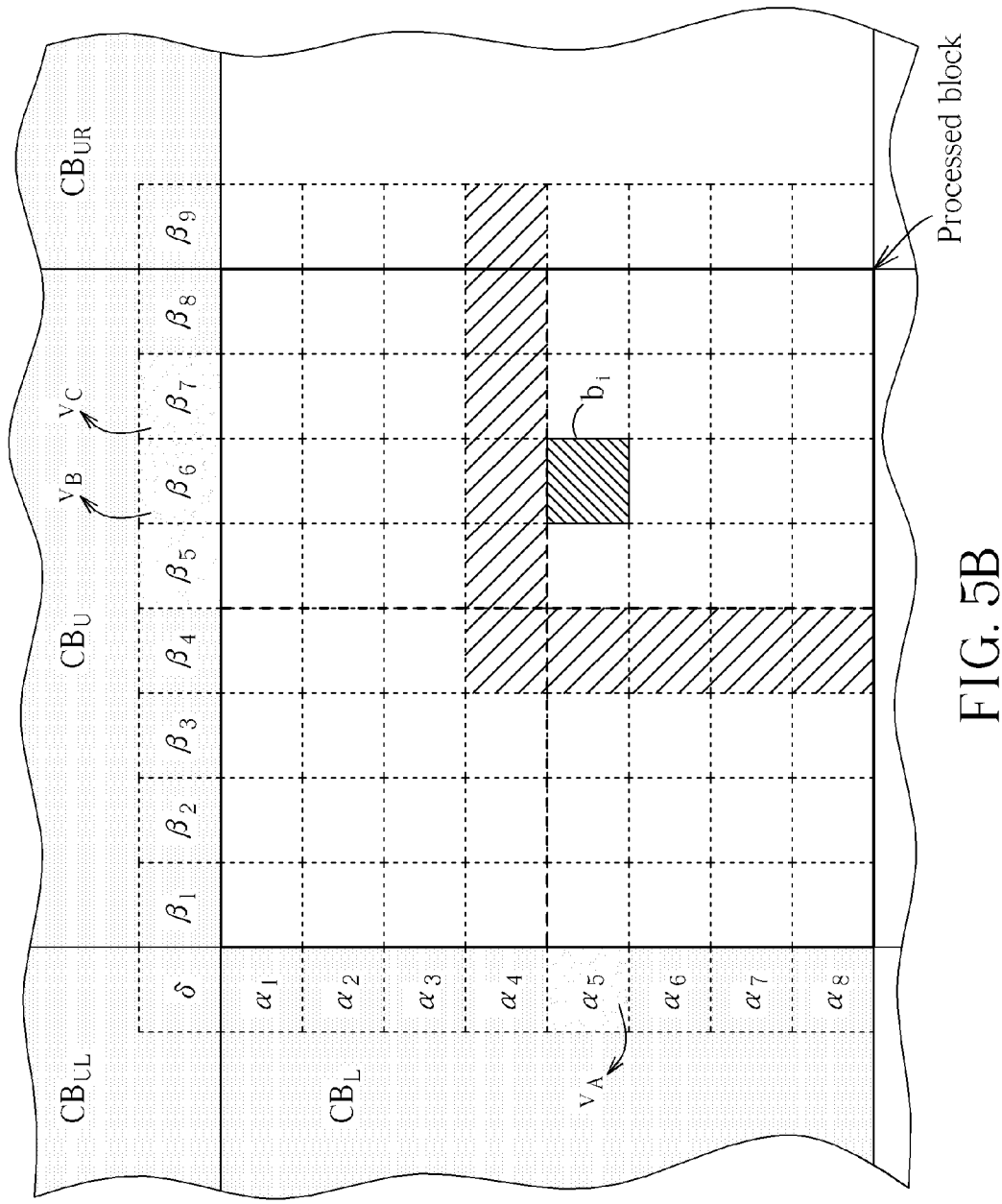

Referring to FIG. 5B, the sub-coding units α$_1$, α$_2$, α$_3$, α$_4$, α$_5$, α$_6$, α$_7$, and α$_8$ belong to the left coded block CB$_L$, the sub-coding units β$_1$, β$_2$, β$_3$, β$_4$, β$_5$, β$_6$, β$_7$, and β$_8$ belong to the upper coded block CB$_U$, and the sub-coding units β$_9$ and δ belong to the upper right coded block CB$_{UR}$ and the upper left coded block CB$_{UL}$, respectively. More particularly, with regard to the i$^{th}$ sub-block b$_i$ shown in FIG. 5B (e.g. a sub-block within the bottom right quarter of the block under processing in this embodiment), the motion vectors {v$_k$} can be obtained from the sub-coding units A, B, C, and/or D of this embodiment, where the sub-coding unit A can be defined as the closest sub-coding unit within the left coded block CB$_L$, the sub-coding unit B can be defined as the closest sub-coding unit within the upper coded block CB$_U$, the sub-coding unit C can be defined as the right adjacent sub-coding unit of the sub-coding unit B, and the sub-coding unit D can be defined as the left adjacent sub-coding unit of the sub-coding unit B. In the situation shown in FIG. 5B, the sub-coding units A, B, C, and D are the sub-coding units α$_5$, β$_6$, β$_7$, and β$_5$, respectively.

In this embodiment, the motion vectors {v$_k$} can be obtained from the sub-coding units A, B, C, and/or D of this embodiment, and therefore, may include the respective motion vectors v$_A$, v$_B$, v$_C$, and/or v$_D$ thereof. For example, the motion vectors {v$_k$} may include all of the motion vectors v$_A$, v$_B$, v$_C$, and v$_D$ of the sub-coding units A, B, C, and D. In another example, the motion vectors {v$_k$} may include the motion vectors v$_A$, v$_B$, and v$_C$ if the sub-coding unit C for the specific sub-coding unit such as the i$^{th}$ sub-block b$_i$ exists. In another example, the motion vectors {v$_k$} may include the motion vectors v$_A$, v$_B$, and v$_D$ if the sub-coding unit C for the specific sub-coding unit such as the i$^{th}$ sub-block b$_i$ does not exist.

Thus, the linear combination mentioned in Step 914 can be the above-disclosed weighted summation Σ$_{k \in K}$(h$_k$(i, x)Ψ$_r$(x+v$_k$)) with the motion vectors {v$_k$} including the motion vectors v$_A$, v$_B$, v$_C$, and/or v$_D$. For brevity, the predicted pixel value Ψ$_p$ can be expressed as follows:

$$Ψ_p = \text{Weighted\_Sum}(Ψ_r(v_A), Ψ_r(v_B), Ψ_r(v_C), \text{and/or } Ψ_r(v_D));$$

where the notation Weighted_Sum represents the weighted summation in the above-disclosed situation. For example, the preprocessing module can determine the size of the specific sub-coding unit to be a transform size regarding video coding of the coding unit, and the size of the sub-coding units such as the sub-blocks shown in FIG. 5B can be the same as the transform size (e.g. 4 by 4, 8 by 8, 16 by 16, and so on).

According to a variation of the embodiment shown in FIG. 5B, the preprocessing module utilizes an average of the plurality of pixel values as the predicted pixel value of the specific sub-coding unit, which means the operation of obtaining the linear combination mentioned in Step 914 can be regarded as an average operation. In this situation, any two of the weighted parameters $\{h_k(i, x)\}$ are equal to each other. For brevity, the predicted pixel value $\Psi_p$ can be expressed as follows:

$$\Psi_p = \text{Average}(\Psi_r(v_A), \Psi_r(v_B), \Psi_r(v_C), \text{ and/or } \Psi_r(v_D));$$

where the notation Average represents the average in this situation. Similar descriptions are not repeated in detail for this variation.

Figure 5C:
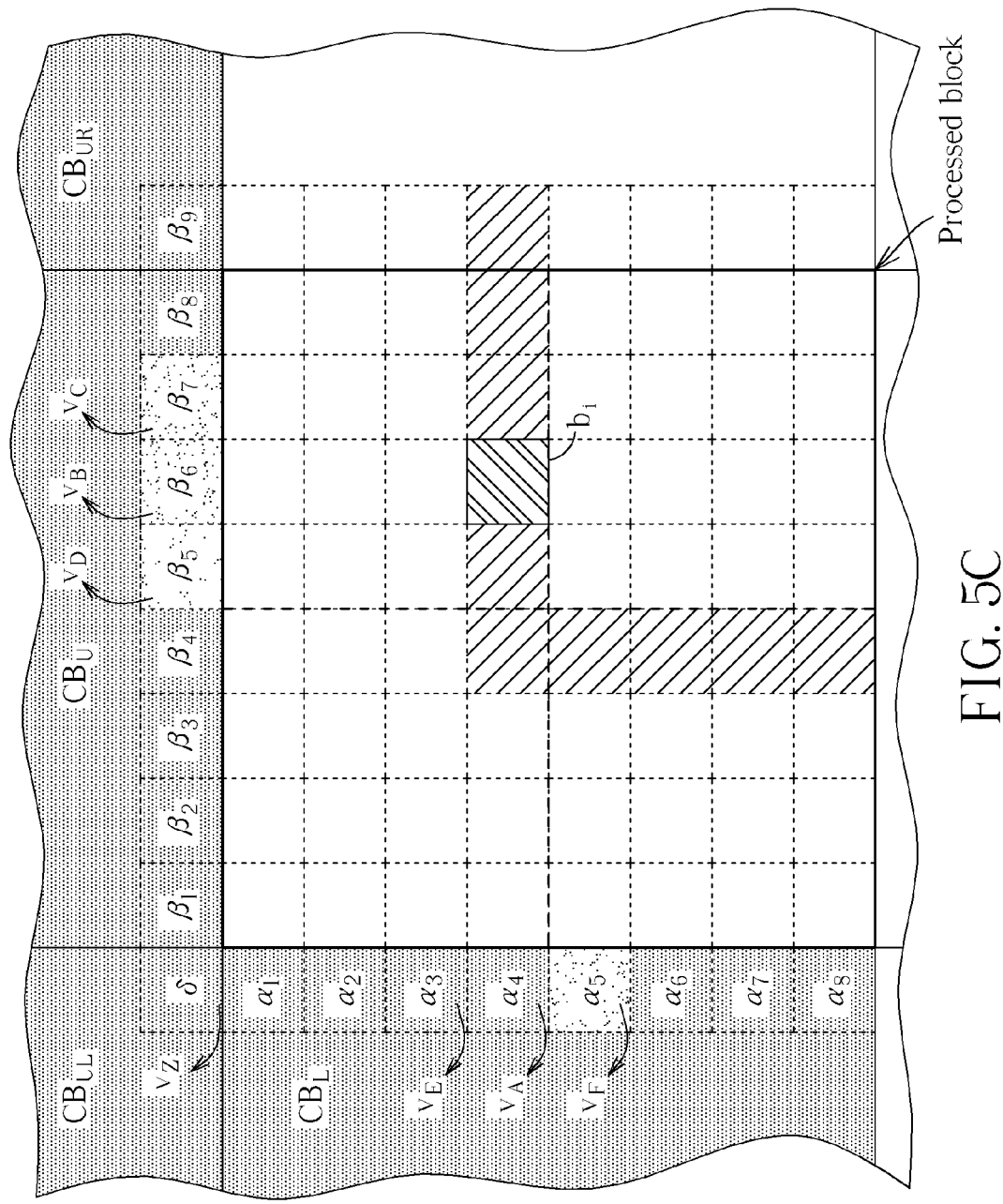

Referring to FIG. 5C, the definitions of the sub-coding units $\{\alpha_1, \alpha_2, \alpha_3, \alpha_4, \alpha_5, \alpha_6, \alpha_7, \alpha_8, \beta_1, \beta_2, \beta_3, \beta_4, \beta_5, \beta_6, \beta_7, \beta_8, \beta_9, \delta\}$ are the same as those of the embodiment shown in FIG. 5B. In addition, with regard to the $i^{th}$ sub-block $b_i$ shown in FIG. 5C (e.g. a sub-block within the upper right quarter of the block under processing in this embodiment), the motion vectors $\{v_k\}$ can be obtained from the sub-coding units A, B, C, D, E, F and/or Z of this embodiment, where the definitions of the sub-coding units A, B, C, and D are the same as those of the embodiment shown in FIG. 5B, the sub-coding unit E can be defined as the upper adjacent sub-coding unit of the sub-coding unit A, the sub-coding unit F can be defined as the bottom adjacent sub-coding unit of the sub-coding unit A, and the sub-coding unit Z can be defined as the closest sub-coding unit within the upper left coded block $CB_{UL}$. In the situation shown in FIG. 5C, the sub-coding units A, B, C, D, E, F and Z are the sub-coding units $\alpha_4$, $\beta_6$, $\beta_7$, $\beta_5$, $\alpha_3$, $\alpha_5$, and $\delta$, respectively.

In this embodiment, the motion vectors $\{v_k\}$ can be obtained from the sub-coding units A, B, C, D, E, F and/or Z of this embodiment, and therefore, may include the respective motion vectors $v_A$, $v_B$, $v_C$, $v_D$, $v_E$, $v_F$, and/or $v_Z$ thereof. For example, the motion vectors $\{v_k\}$ may include all of the motion vectors $v_A$, $v_B$, $v_C$, $v_D$, $v_E$, $v_F$, and $v_Z$ of the sub-coding units A, B, C, D, E, F and Z. In another example, the motion vectors $\{v_k\}$ may include the motion vectors $v_A$, $v_B$, $v_C$, $v_D$, $v_E$, and $v_F$ if the sub-coding unit E for the specific sub-coding unit such as the $i^{th}$ sub-block $b_i$ exists. In another example, the motion vectors $\{v_k\}$ may include the motion vectors $v_A$, $v_B$, $v_C$, $v_D$, $v_F$, and $v_Z$ if the sub-coding unit E for the specific sub-coding unit such as the $i^{th}$ sub-block $b_i$ does not exist. In another example, the motion vectors $\{v_k\}$ may include the motion vectors $v_A$, $v_B$, $v_D$, $v_F$, and $v_Z$ if the sub-coding units C and E for the specific sub-coding unit such as the $i^{th}$ sub-block $b_i$ do not exist.

Thus, the linear combination mentioned in Step 914 can be the above-disclosed weighted summation $\Sigma_{k \in K}(h_k(i, x)\Psi_r(x+v_k))$ with the motion vectors $\{v_k\}$ including the motion vectors $v_A$, $v_B$, $v_C$, $v_D$, $v_E$, $v_F$, and/or $v_Z$. For brevity, the predicted pixel value $\Psi_p$ can be expressed as follows:

$$\Psi_p = \text{Weighted\_Sum}(\Psi_r(v_A), \Psi_r(v_B), \Psi_r(v_C), \Psi_r(v_D), \Psi_r(v_E), \Psi_r(v_F), \text{ and/or } \Psi_r(v_Z));$$

where the notation Weighted_Sum represents the weighted summation in the above-disclosed situation. For example, the preprocessing module can determine the size of the specific sub-coding unit to be a transform size regarding video coding of the coding unit, and the size of the sub-coding units such as the sub-blocks shown in FIG. 5C can be the same as the transform size (e.g. 4 by 4, 8 by 8, 16 by 16, and so on).

According to a variation of the embodiment shown in FIG. 5C, the preprocessing module utilizes an average of the plurality of pixel values as the predicted pixel value of the specific sub-coding unit, which means the operation of obtaining the linear combination mentioned in Step 914 can be regarded as an average operation. In this situation, any two of the weighted parameters $\{h_k(i, x)\}$ are equal to each other. For brevity, the predicted pixel value $\Psi_p$ can be expressed as follows:

$$\Psi_p = \text{Average}(\Psi_r(v_A), \Psi_r(v_B), \Psi_r(v_C), \Psi_r(v_D), \Psi_r(v_E), \Psi_r(v_F), \text{ and/or } \Psi_r(v_Z));$$

where the notation Average represents the average in this situation. Similar descriptions are not repeated in detail for this variation.

Figure 5D:
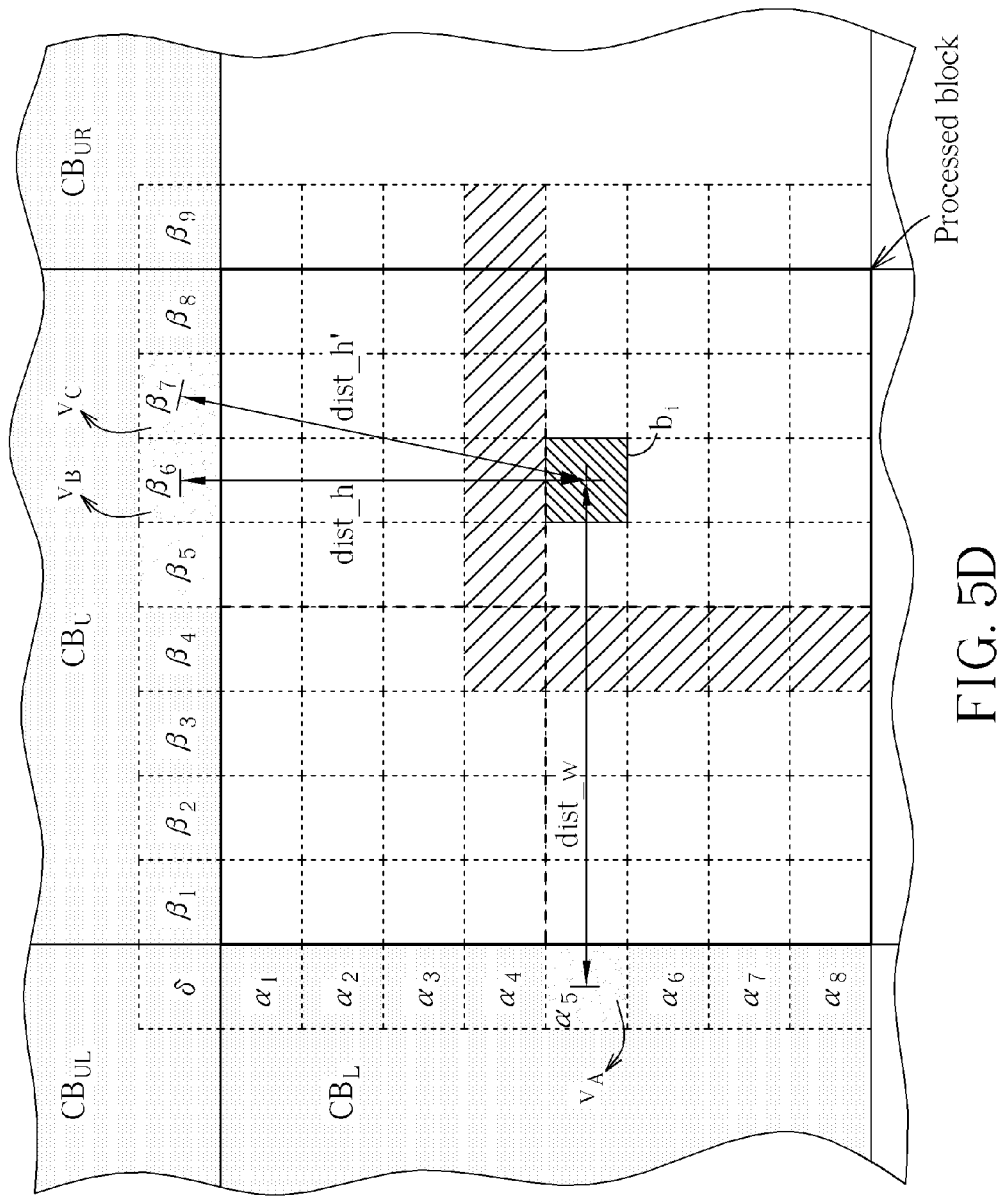

Referring to FIG. 5D, the definitions of the sub-coding units $\{\alpha_1, \alpha_2, \alpha_3, \alpha_4, \alpha_5, \alpha_6, \alpha_7, \alpha_8, \beta_1, \beta_2, \beta_3, \beta_4, \beta_5, \beta_6, \beta_7, \beta_8, \beta_9, \delta\}$ are the same as those of the embodiment shown in FIG. 5B. In addition, with regard to the $i^{th}$ sub-block $b_i$ shown in FIG. 5D (e.g. a sub-block within the bottom right quarter of the block under processing in this embodiment), the motion vectors $\{v_k\}$ can be obtained from the sub-coding units A, B, C, and/or D of this embodiment, where the definitions of the sub-coding units A, B, C, and D are the same as those of the embodiment shown in FIG. 5B. In the situation shown in FIG. 5C, the sub-coding units A, B, C, and D are the sub-coding units $\alpha_5$, $\beta_6$, $\beta_7$, and $\beta_5$, respectively.

In this embodiment, the motion vectors $\{v_k\}$ can be obtained from the sub-coding units A, B, C, and/or D of this embodiment, and therefore, may include the respective motion vectors $v_A$, $v_B$, $v_C$, and/or $v_D$ thereof. For example, the motion vectors $\{v_k\}$ may include all of the motion vectors $v_A$, $v_B$, $v_C$, and $v_D$ of the sub-coding units A, B, C, and D. In another example, the motion vectors $\{v_k\}$ may include the motion vectors $v_A$, $v_B$, and $v_C$ if the sub-coding unit C for the specific sub-coding unit such as the $i^{th}$ sub-block $b_i$ exists. In another example, the motion vectors $\{v_k\}$ may include the motion vectors $v_A$, $v_B$, and $v_D$ if the sub-coding unit C for the specific sub-coding unit such as the $i^{th}$ sub-block $b_i$ does not exist.

In addition, a weighted parameter $h_k(i, x)$ of this embodiment may be inversely proportional to a distance between the specific sub-coding unit and the associated one of the other coded units mentioned in Step 912. For example, the weighted parameter $h_k(i, x)$ can be rewritten as $w_k(i)$ having no dependency of the position x, and the weighted parameter $w_k(i)$ is inversely proportional to $(d_k(i))^m$ (i.e. $w_k(i) \propto 1/(d_k(i))^m$), where the notation $d_k(i)$ represents the distance between the specific sub-coding unit (e.g. the $i^{th}$ sub-block b) and the associated other sub-coding/coding unit having the $k^{th}$ reference motion vector $v_k$ (e.g. the $k^{th}$ sub-coding unit within the sub-coding units A, B, C, and D), and the notation m represents a positive constant. Thus, the predicted pixel value $\Psi_p$ can be expressed as follows:

$$\Psi_p(i, x) = \Sigma_{k \in K}(w_k(i)\Psi_r(x+v_k)); \text{ or}$$

$$\Psi_p = \Sigma_{k \in K}(w_k\Psi_r(v_k));$$

where the motion vectors $\{v_k\}$ may include the motion vectors $v_A$, $v_B$, $v_C$, and/or $v_D$. In the situation shown in FIG. 5D, the motion vectors $\{v_k\}$ includes the motion vectors $v_A$, $v_B$, and $v_C$, and the notations dist_w, dist_h, and dist_h' represent the distances $d_A(i)$, $d_B(i)$, and $d_C(i)$, respectively. As a result, the predicted pixel value $\Psi_p$ can be expressed as follows:

$$\Psi_p = w_A \Psi_r(v_A) + w_B \Psi_r(v_B) + w_C \Psi_r(v_C);$$

where $w_A \propto 1/(\text{dist\_w})^m$, $w_B \propto 1/(\text{dist\_h})^m$, and $w_C \propto 1/(\text{dist\_h}')^m$.

In some variations of the embodiments shown in 5A-5D, the preprocessing module can screen a set of motion vectors by discarding at least one extreme motion vector in motion information of multiple coded units, and more particularly, by discarding at least one extreme motion vector of the set of motion vectors, in order to select a remaining portion of the set of motion vectors as the motion information for deriving the predicted pixel value (e.g. the motion information of the first set of coded units). For example, the aforementioned at least one extreme motion vector may comprise one or more motion vectors that are much different from others of the set of motion vectors, with the lengths and/or the directions thereof being considered.

According to some variations of the embodiments shown in FIGS. 5A-5D, the preprocessing module may selectively operate in any of a plurality of modes comprising Modes 1, 2, 3, and 4, where the respective operations of Modes 1, 2, 3, and 4 can be the same as or similar to those disclosed in the embodiments shown in FIGS. 5A-5D, respectively. For example, in Mode 1, the preprocessing module can operate according to the same method of the embodiment shown in FIG. 5A, while in another mode such as any of Modes 2, 3, and 4, the preprocessing module can operate according to the same method of the associated embodiment such as the corresponding embodiment within those shown in FIGS. 5B-5D, respectively. In addition, the aforementioned Modes 1, 2, and 3 allow the apparatus 100 to process with ease in comparison of some other mode(s) and are helpful on increasing the overall processing speed of the apparatus 100, and therefore, can be referred to as simplified modes.

According to a variation of any of the embodiments shown in FIGS. 5A-5D, in Step 912, the preprocessing module can divide the coding unit into the plurality of sub-coding units based upon at least one mode of at least one neighboring coding unit, such as Modes 1, 2, 3, and/or 4 of one or more of the coded blocks $CB_L$, $CB_U$, $CB_{UR}$, and $CB_{UL}$. According to another variation of any of the embodiments shown in FIGS. 5A-5D, in Step 912, the preprocessing module can divide the coding unit into the plurality of sub-coding units based upon contents of at least one neighboring coding unit such as one or more of the coded blocks $CB_L$, $CB_U$, $CB_{UR}$, and $CB_{UL}$.

Figure 6A:
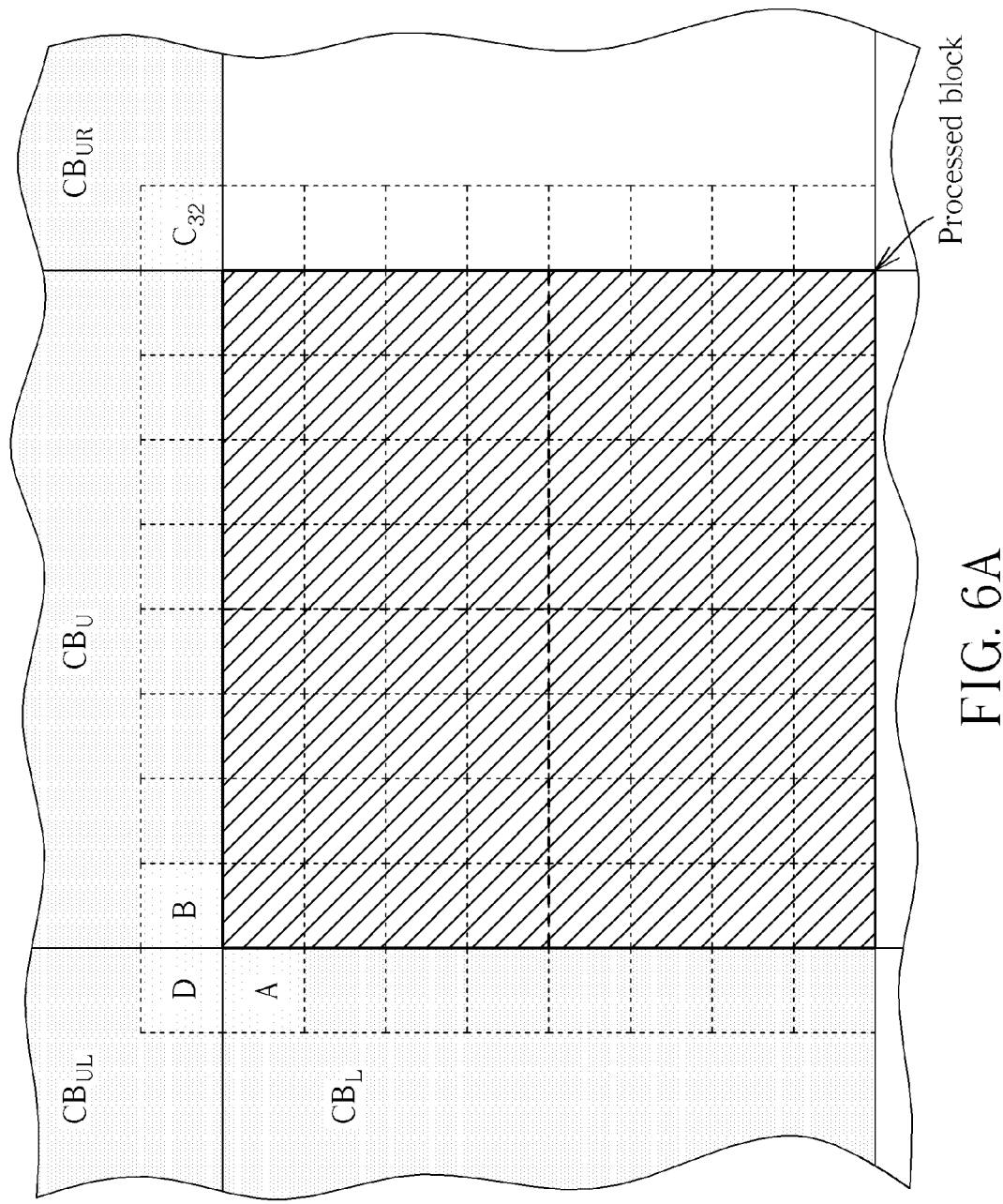
FIGS. 6A-6B illustrate exemplary sources for obtaining motion information that are involved with the method shown in FIG. 2 according to different embodiments of the present invention.
Figure 6B:
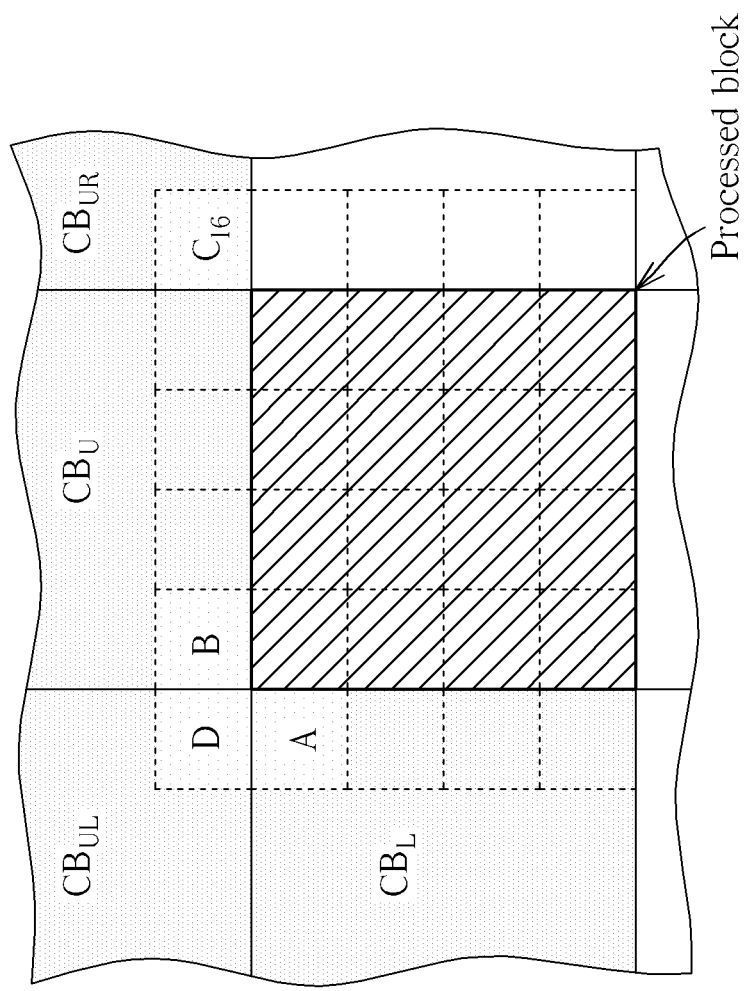

FIGS. 6A-6B illustrate exemplary sources for obtaining motion information that are involved with the method 910 shown in FIG. 2 according to different embodiments of the present invention. For better comprehension, the coded blocks $CB_L$, $CB_{UL}$, $CB_U$, and $CB_{UR}$ can be the same as those shown in FIG. 3, respectively.

In this embodiment, in a situation where the size of the specific sub-coding unit $SubCU(t_0)$ is extended to the size of the coding unit $CU(t_0)$, dividing/partitioning the coding unit $CU(t_0)$ is not required in Step 912. Thus, in Step 912, the preprocessing module mentioned above can perform motion vector prediction of the coding unit $CU(t_0)$, and more particularly, obtain a plurality of motion vectors, such as the motion vectors $\{v_k\}$ disclosed above, for multihypothesis motion compensation of the coding unit $CU(t_0)$ from a plurality of other coded units such as at least a portion of the coded blocks $\{CB\}$ (e.g. one or more of the coded blocks $CB_L$, $CB_{UL}$, $CB_U$, and $CB_{UR}$). In addition, in Step 914, the preprocessing module can perform multihypothesis motion compensation on the coding unit $CU(t_0)$ according to motion information such as the plurality of motion vectors $\{v_k\}$, and more particularly, utilize a linear combination of a plurality of pixel values of the plurality of other coding units as a predicted pixel value of the coding unit, such as the predicted pixel value $\Psi_p(x)$ having no need to use the index i. Similarly, the predicted pixel value $\Psi_p(x)$ can be expressed as follows:

$$\Psi_p(x) = \Sigma_{k \in K}(h_k(x) \Psi_r(x + v_k)).$$

In practice, the plurality of modes may further comprise some skip modes respectively corresponding to different motion block sizes (e.g. 16 by 16, 32 by 32, etc.). According to this embodiment, the notation A can be utilized for representing a sub-coding/coding unit comprising at least a portion (e.g. a portion or all) of the coded block $CB_L$, the notation D can be utilized for representing a sub-coding/coding unit comprising at least a portion (e.g. a portion or all) of the coded block $CB_{UL}$, the notation B can be utilized for representing a sub-coding/coding unit comprising at least a portion (e.g. a portion or all) of the coded block $CB_U$, and the notation $C_{SIZE}$ such as $C_{16}$, $C_{32}$, etc. can be utilized for representing a sub-coding/coding unit comprising at least a portion (e.g. a portion or all) of the coded block $CB_{UR}$, where the suffix SIZE of the notation $C_{SIZE}$ represents the size of the coding unit $CU(t_0)$ such as the block under processing (labeled "Processed block" in FIGS. 6A-6B). For example, in a situation where the block under processing includes (32*32) pixels, the sub-coding/coding unit $C_{SIZE}$ can be the sub-coding/coding unit $C_{32}$ shown in FIG. 6A. In another example, in a situation where the block under processing includes (16*16) pixels, the sub-coding/coding unit $C_{SIZE}$ can be the sub-coding/coding unit $C_{16}$ shown in FIG. 6B. Thus, the location of the sub-coding/coding unit $C_{SIZE}$ is dependent on the motion block size.

According to this embodiment, the motion vectors $\{v_k\}$ may include all of the motion vectors $v_A$, $v_B$, $v_C$, and $v_D$ of the sub-coding/coding unit units A, B, $C_{SIZE}$, and D. Thus, the linear combination of this embodiment can be the weighted summation $\Sigma_{k \in K}(h_k(x) \Psi_r(x + v_k))$ with the motion vectors $\{v_k\}$ including the motion vectors $v_A$, $v_B$, $v_C$, and $v_D$. For brevity, the predicted pixel value $\Psi_p$ can be expressed as follows:

$$\Psi_p = \text{Weighted\_Sum}(\Psi_r(v_A), \Psi_r(v_B), \Psi_r(v_D));$$

where the notation Weighted_Sum represents the weighted summation in the above-disclosed situation.

According to a variation of the embodiment shown in FIGS. 6A-6B, the preprocessing module utilizes an average of the plurality of pixel values of the plurality of other coding units as the predicted pixel value of the coding unit, which means the linear combination mentioned above can be regarded as the average. In this situation, any two of the weighted parameters $\{h_k(x)\}$ are equal to each other. For brevity, the predicted pixel value $\Psi_p$ can be expressed as follows:

$$\Psi_p = \text{Average}(\Psi_r(v_A), \Psi_r(v_B), \Psi_r(v_D));$$

where the notation Average represents the average in this situation. Similar descriptions are not repeated in detail for this variation.

Figure 7A:
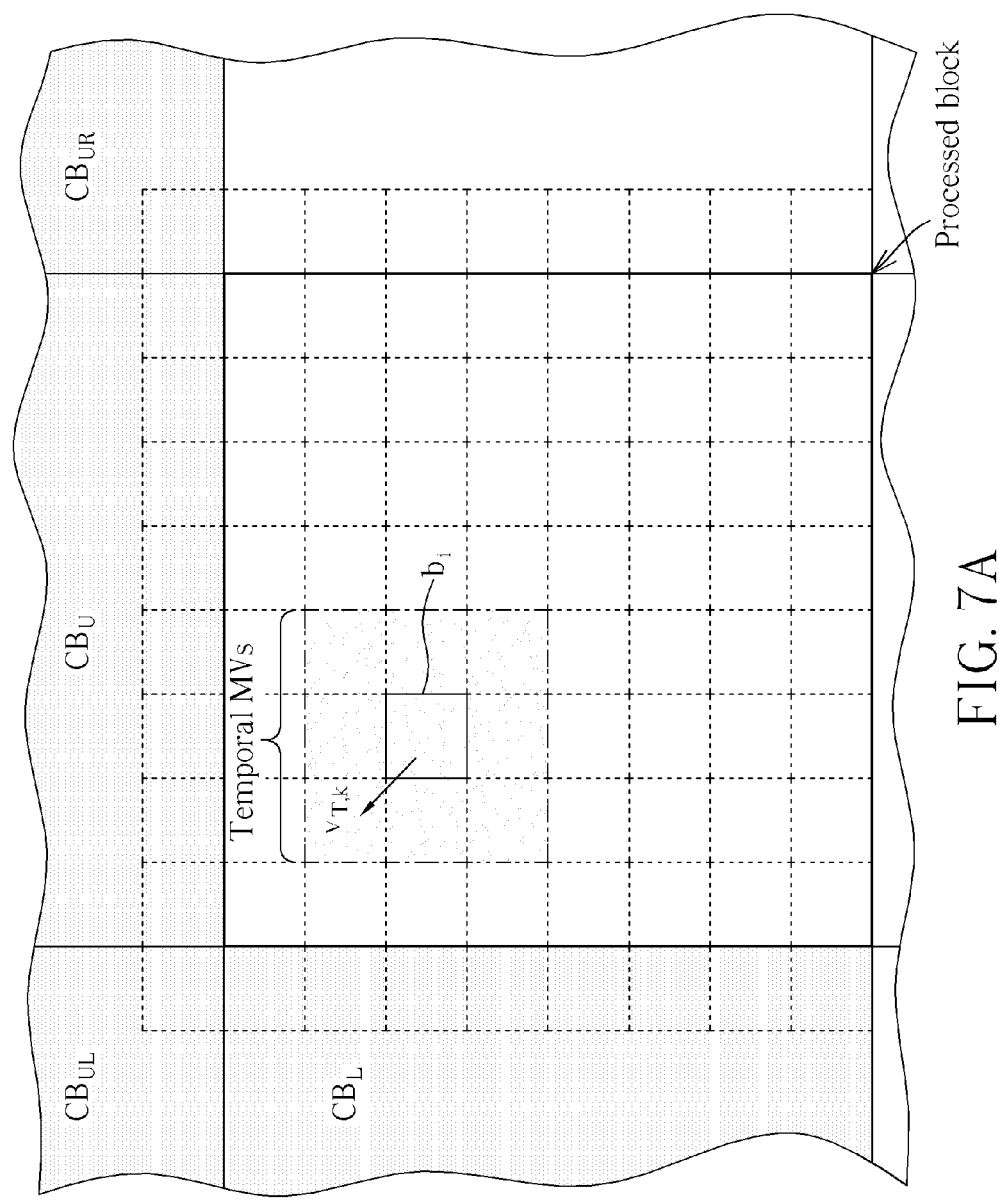
FIGS. 7A-7B respectively illustrate temporal and spatial motion vectors (MVs) involved with the method shown in FIG. 2 according to different embodiments of the present invention.
Figure 7B:
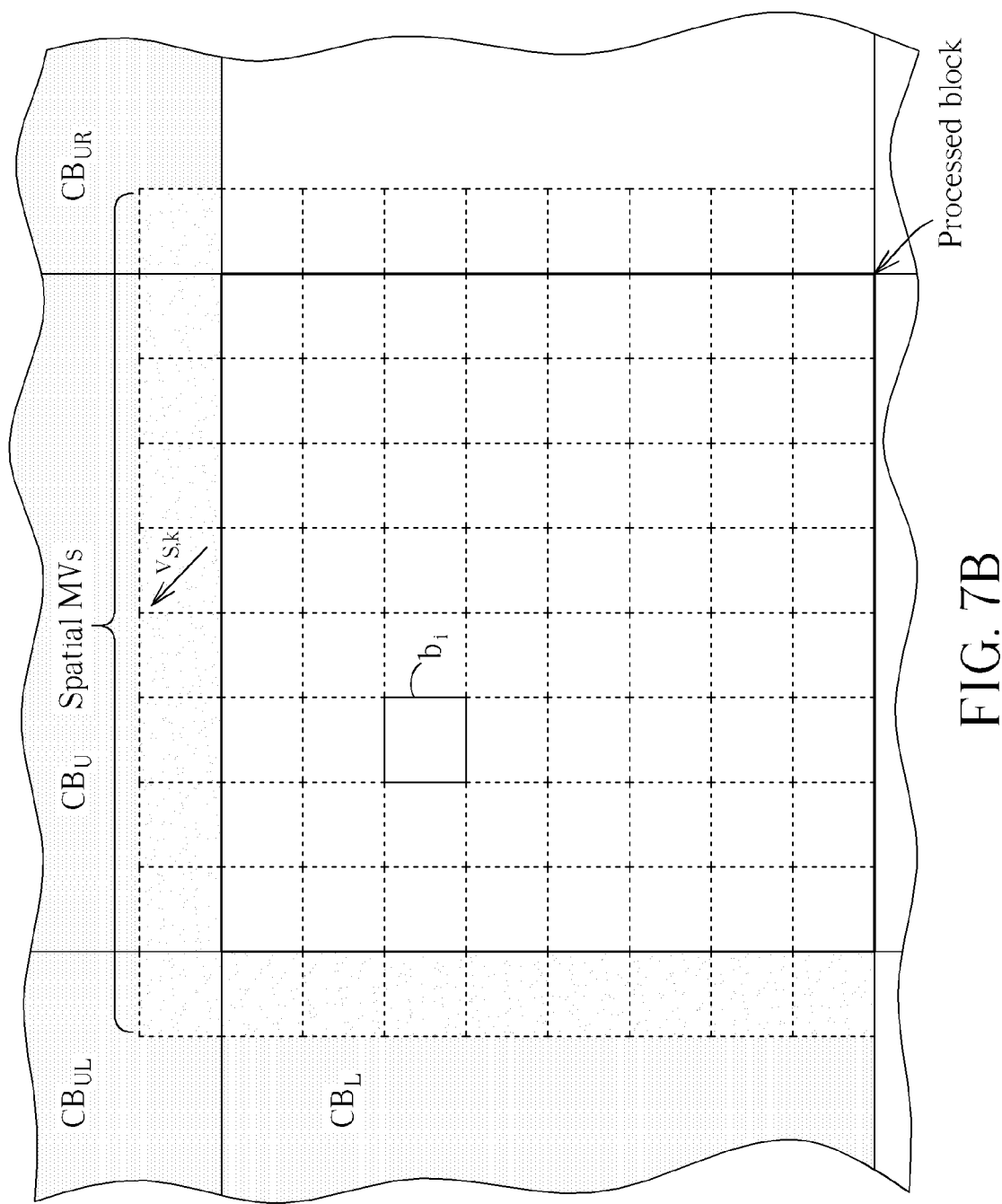

FIGS. 7A-7B respectively illustrate temporal and spatial motion vectors (MVs) involved with the method 910 shown in FIG. 2 according to different embodiments of the present invention. For better comprehension, the coded blocks $CB_L$, $CB_{UL}$, $CB_U$, and $CB_{UR}$ can be the same as those shown in FIG. 3, respectively. In addition, the $i^{th}$ sub-block $b_i$ is illustrated as an example of the specific sub-coding unit $SubCU(t_0)$.

In the embodiment shown in FIG. 7A, the motion vectors $\{v_k\}$ mentioned in Step 912 may comprise one or more temporal motion vectors $\{v_{T,k}\}$ with respect to a window enclosing the specific sub-coding unit SubCU($t_0$) such as the $i^{th}$ sub-block $b_i$ shown in FIG. 7A, where the window may have a predetermined size. In the embodiment shown in FIG. 7B, the motion vectors $\{v_k\}$ mentioned in Step 912 may comprise one or more spatial motion vectors $\{v_{S,k}\}$, such as that of the coded block $CB_U$ shown in FIG. 7B. According to some variations of the embodiments shown in FIGS. 7A-7B, the motion vectors $\{v_k\}$ mentioned in Step 912 may comprise the temporal motion vectors $\{v_{T,k}\}$ and the spatial motion vectors $\{v_{S,k}\}$. Similar descriptions are not repeated in detail for these embodiments/variations.

Figure 8A:
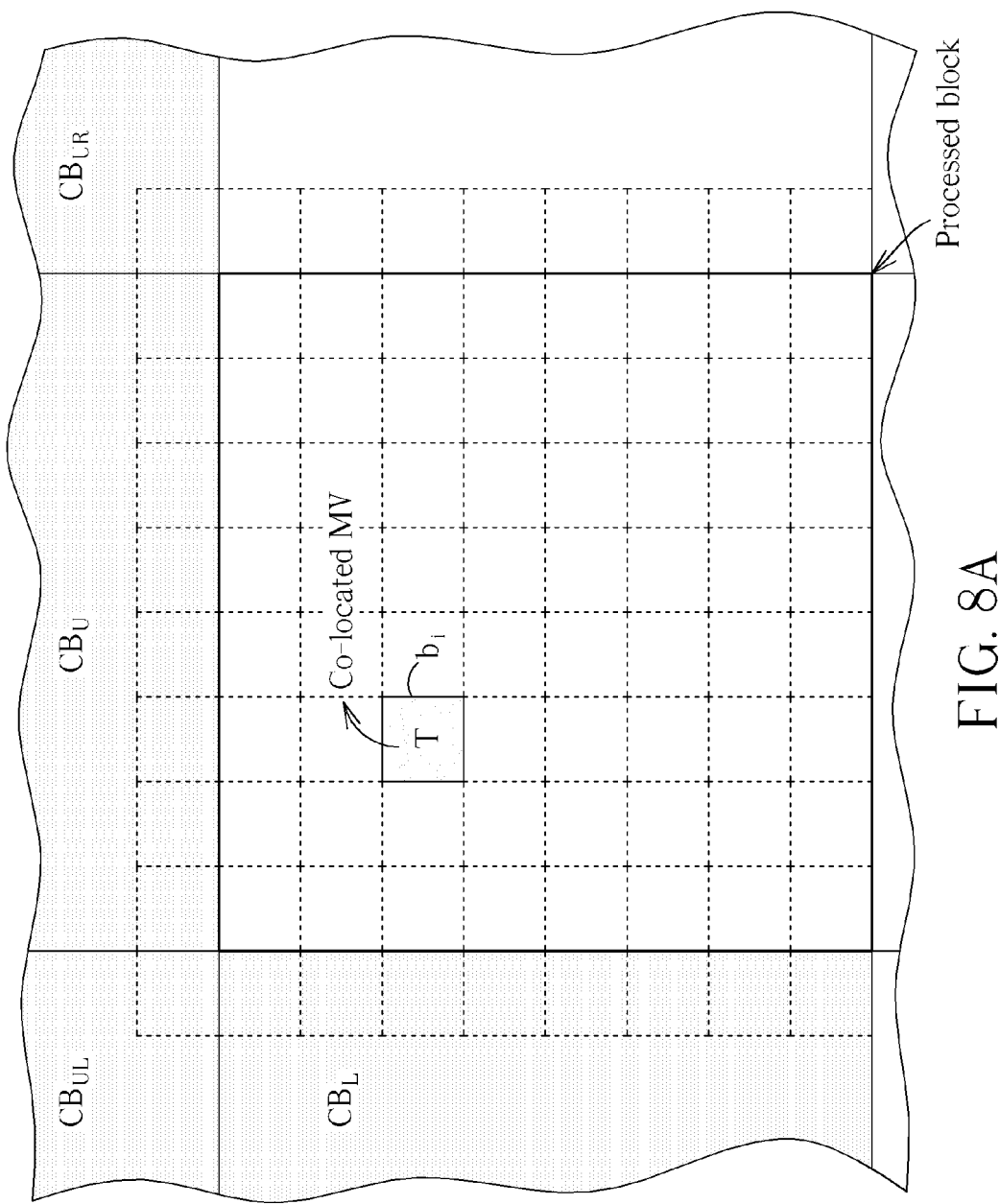
FIGS. 8A-8C illustrate exemplary sources for obtaining motion vectors that are involved with the method shown in FIG. 2 according to some embodiments of the present invention.
Figure 8B:
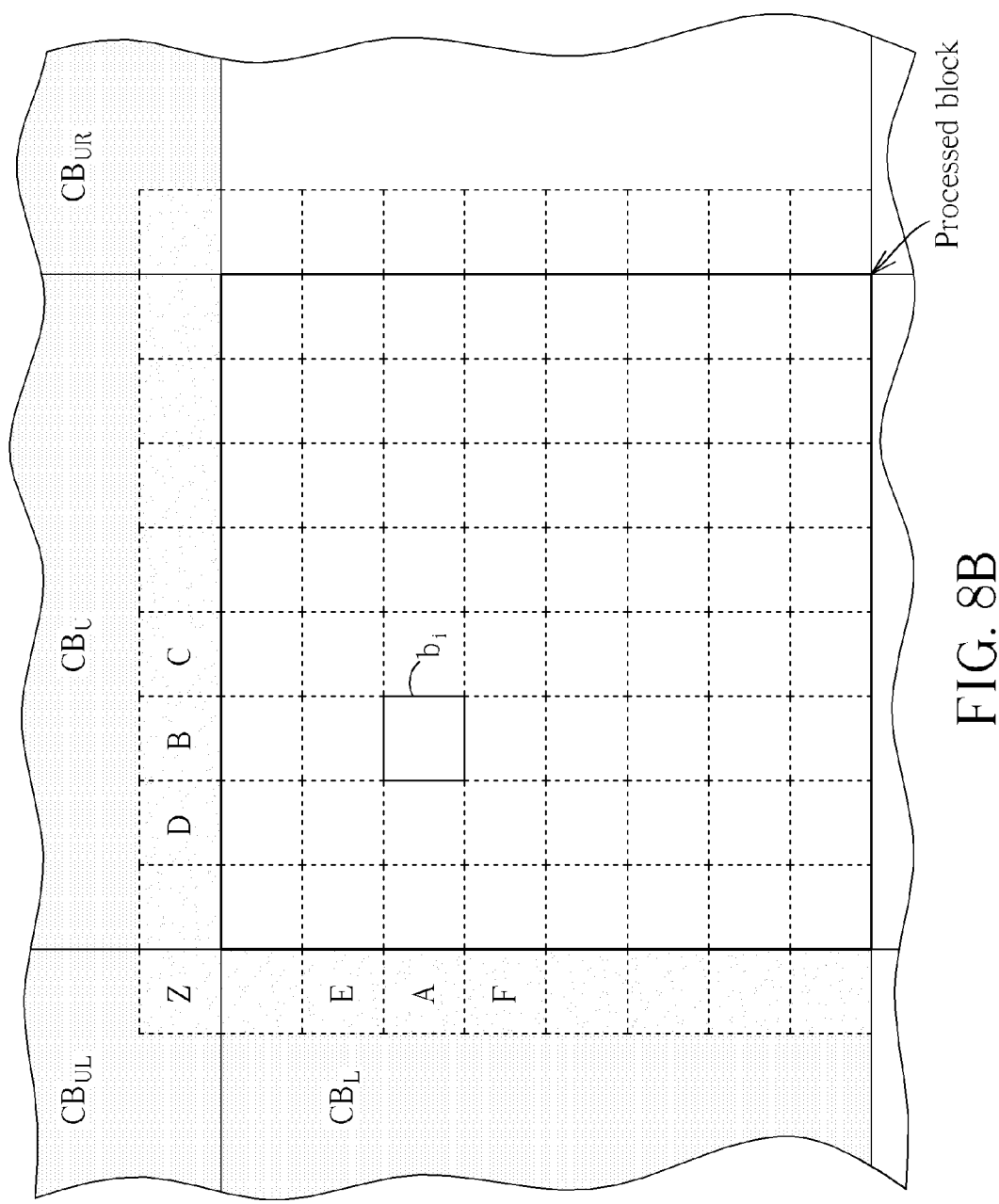
Figure 8C:
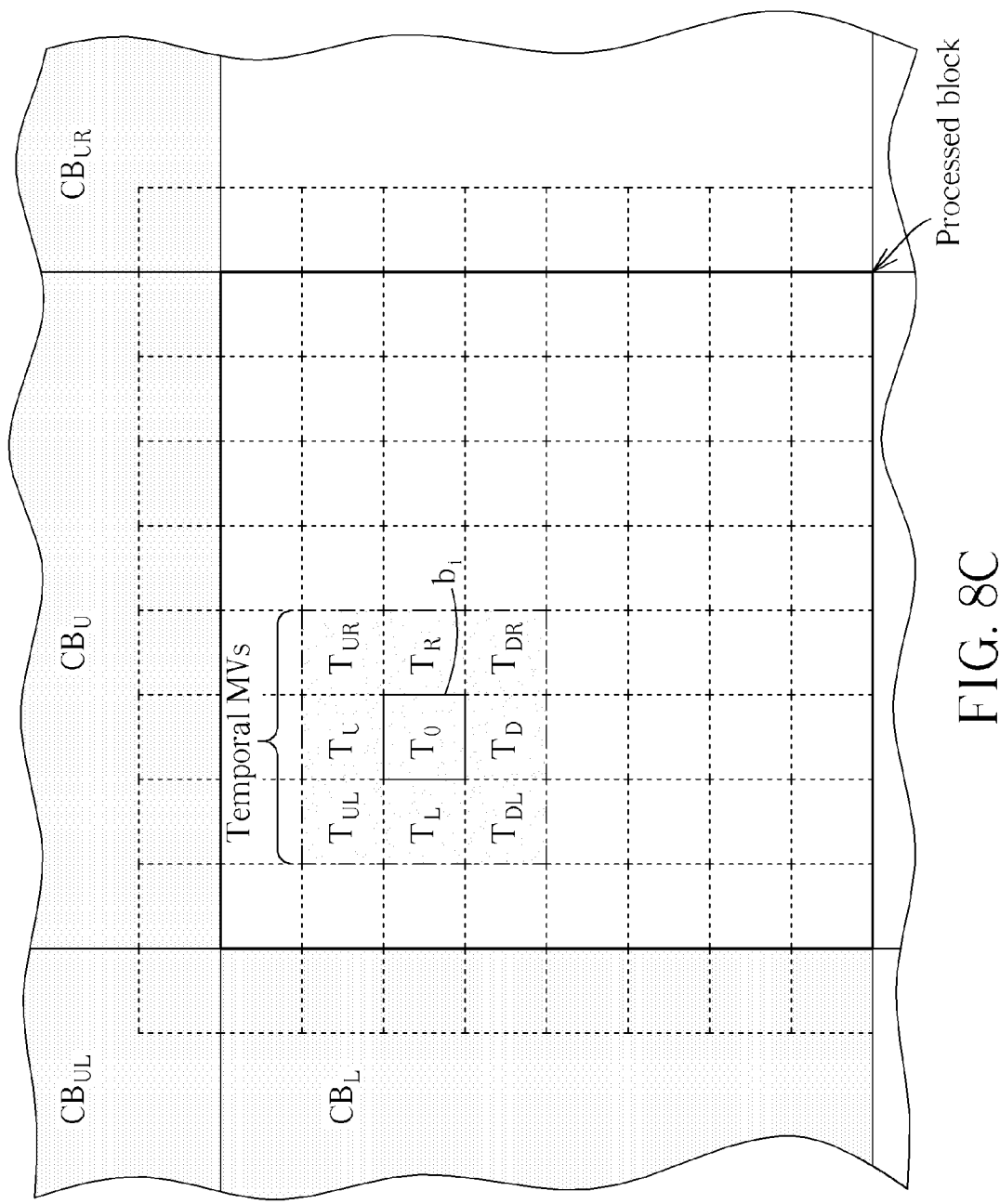

FIGS. 8A-8C illustrate exemplary sources for obtaining motion vectors that are involved with the method 910 shown in FIG. 2 according to some embodiments of the present invention. For better comprehension, the coded blocks $CB_L$, $CB_{UL}$, $CB_U$, and $CB_{UR}$ can be the same as those shown in FIG. 3, respectively. In addition, the $i^{th}$ sub-block $b_i$ is illustrated as an example of the specific sub-coding unit SubCU ($t_0$). Referring to FIG. 8A, the temporal motion vectors $\{v_{T,k}\}$ disclosed above may comprise a temporal motion vector $v_{T_0}$ that is typically obtained from a co-located sub-coding unit of another frame, such as a co-located sub-block T with respect to the $i^{th}$ sub-block $b_i$ shown in FIG. 8A. Thus, the temporal motion vector $v_{T_0}$ can be regarded as a co-located motion vector. Referring to FIG. 8B, the spatial motion vectors $\{v_{S,k}\}$ disclosed above may comprise at least a portion (e.g. a portion or all) of the motion vectors $v_A$, $v_B$, $v_C$, $v_D$, $v_E$, $v_F$, and $v_Z$ of the sub-coding units A, B, C, D, E, F and Z.

Thus, the linear combination mentioned in Step 914 can be the above-disclosed weighted summation $\Sigma_{k \in K}(h_k(i, x)\Psi_r(x+v_k))$ with the motion vectors $\{v_k\}$ comprising both the temporal motion vector $v_{T_0}$ and the motion vectors $v_A$, $v_B$, $v_C$, $v_D$, $v_E$, $v_F$, and/or $v_Z$. For example, in a situation where the motion vectors $\{v_k\}$ comprise the temporal motion vector $v_{T_0}$ and the motion vectors $v_A$, $v_B$, $v_C$, $v_D$, $v_E$, $v_F$, and $v_Z$, the predicted pixel value $\Psi_p$ can be expressed as follows:

$$\Psi_p = \text{Weighted\_Sum}(\Psi_r(v_A), \Psi_r(v_B), \Psi_r(v_C), \Psi_r(v_D), \Psi_r(v_E), \Psi_r(v_F), \Psi_r(v_Z), \Psi_r(v_{T_0}));$$

where the notation Weighted_Sum represents the weighted summation in the above-disclosed situation. Similar descriptions are not repeated in detail for this embodiment.

According to a variation of the embodiment shown in FIGS. 8A-8B, the preprocessing module utilizes an average of the plurality of pixel values as the predicted pixel value of the specific sub-coding unit, which means the linear combination mentioned in Step 914 can be regarded as the average. In this situation, any two of the weighted parameters $\{h_k(i, x)\}$ are equal to each other. For brevity, the predicted pixel value $\Psi_p$ can be expressed as follows:

$$\Psi_p = \text{Average}(\Psi_r(v_A), \Psi_r(v_B), \Psi_r(v_C), \Psi_r(v_D), \Psi_r(v_E), \Psi_r(v_F), \Psi_r(v_Z), \Psi_r(v_{T_0}));$$

where the notation Average represents the average in this situation. Similar descriptions are not repeated in detail for this variation.

Referring to FIG. 8C, the temporal motion vectors $\{v_{T,k}\}$ disclosed above may comprise the temporal motion vector $v_{T_0}$ disclosed above and some other temporal motion vectors $v_{T_{UL}}$, $v_{T_U}$, $v_{T_{UR}}$, $v_{T_L}$, $v_{T_R}$, $v_{T_{DL}}$, $v_{T_D}$, and $v_{T_{DR}}$ that are obtained from nearly co-located sub-coding units of another frame, such as those adjacent to the sub-block T having the temporal motion vector $v_{T_0}$, i.e. the sub-blocks $T_{UL}$, $T_U$, $T_{UR}$, $T_L$, $T_R$, $T_{DL}$, $T_D$, and $T_{DR}$ shown in FIG. 8C, respectively. In addition, the spatial motion vectors $\{v_{S,k}\}$ disclosed above may comprise at least a portion (e.g. a portion or all) of the motion vectors $v_A$, $v_B$, $v_C$, $v_D$, $v_E$, $v_F$, and $v_Z$ of the sub-coding units A, B, C, D, E, F and Z shown in FIG. 8B.

Thus, the linear combination mentioned in Step 914 can be the above-disclosed weighted summation $\Sigma_{k \in K}(h_k(i, x)\Psi_r(x+v_k))$ with the motion vectors $\{v_k\}$ comprising both the temporal motion vectors $v_{T_0}$, $v_{T_{UL}}$, $v_{T_U}$, $v_{T_{UR}}$, $v_{T_L}$, $v_{T_R}$, $v_{T_{DL}}$, $v_{T_D}$, and $v_{T_{DR}}$ and the motion vectors $v_A$, $v_B$, $v_C$, $v_D$, $v_E$, $v_F$, and/or $v_Z$. For example, in a situation where the motion vectors $\{v_k\}$ comprise the temporal motion vectors $v_{T_0}$, $v_{T_{UL}}$, $v_{T_U}$, $v_{T_{UR}}$, $v_{T_L}$, $v_{T_R}$, $v_{T_{DL}}$, $v_{T_D}$, and $v_{T_{DR}}$ and the motion vectors $v_A$, $v_B$, $v_C$, $v_D$, $v_E$, $v_F$, and $v_Z$, the predicted pixel value $\Psi_p$ can be expressed as follows:

$$\Psi_p = \text{Weighted\_Sum}(\Psi_r(v_A), \Psi_r(v_B), \Psi_r(v_C), \Psi_r(v_D), \Psi_r(v_E), \Psi_r(v_F), \Psi_r(v_Z), \Psi_r(v_{T_0}), \Psi_r(v_{T_{UL}}), \Psi_r(v_{T_U}), \Psi_r(v_{T_{UR}}), \Psi_r(v_{T_L}), \Psi_r(v_{T_R}), \Psi_r(v_{T_{DL}}), \Psi_r(v_{T_D}), \Psi_r(v_{T_{DR}}));$$

where the notation Weighted_Sum represents the weighted summation in the above-disclosed situation. Similar descriptions are not repeated in detail for this embodiment.

According to a variation of the embodiment shown in FIG. 8C, the preprocessing module utilizes an average of the plurality of pixel values as the predicted pixel value of the specific sub-coding unit, which means the linear combination mentioned in Step 914 can be regarded as the average. In this situation, any two of the weighted parameters $\{h_k(i, x)\}$ are equal to each other. For brevity, the predicted pixel value $\Psi_p$ can be expressed as follows:

$$\Psi_p = \text{Average}(\Psi_r(v_A), \Psi_r(v_B), \Psi_r(v_C), \Psi_r(v_D), \Psi_r(v_E), \Psi_r(v_F), \Psi_r(v_Z), \Psi_r(v_{T_0}), \Psi_r(v_{T_{UL}}), \Psi_r(v_{T_U}), \Psi_r(v_{T_{UR}}), \Psi_r(v_{T_L}), \Psi_r(v_{T_R}), \Psi_r(v_{T_{DL}}), \Psi_r(v_{T_D}), \Psi_r(v_{T_{DR}}));$$

where the notation Average represents the average in this situation. Similar descriptions are not repeated in detail for this variation.

According to an embodiment, such as a variation of any of the embodiments/variations disclosed above, the preprocessing module can dynamically select a set of motion vectors from a plurality of sets of motion vectors (which can be regarded as candidate motion vectors), and utilize the selected set of motion vectors as the plurality of motion vectors $\{v_k\}$. More particularly, the preprocessing module dynamically selects the aforementioned set of motion vectors from the plurality of sets of motion vectors and utilizes the selected set of motion vectors as the motion information of the plurality of other coded units mentioned in Step 912 (e.g. the first set of coded units) based on an explicit flag, and utilizes the selected set of motion vectors to derive the predicted pixel value of the specific sub-coding unit. For example, the plurality of sets of motion vectors may comprise a first set of motion vectors such as the temporal motion vectors $\{v_{T,k}\}$ disclosed above, and further comprise a second set of motion vectors such as the spatial motion vectors $\{v_{S,k}\}$ disclosed above. In practice, the preprocessing module can perform multihypothesis prediction based upon a flag (e.g. the explicit flag) dynamically indicating the set being selected. Similar descriptions are not repeated in detail for this embodiment.

According to another embodiment, such as a variation of any of the embodiments/variations disclosed above, the preprocessing module can obtain at least one motion vector of the coding unit CU($t_0$) by performing motion estimation, for use of performing rate-distortion optimization, in order to obtain the predicted pixel value of the specific sub-coding unit. For example, in Step 912, the preprocessing module obtains at least one portion of the plurality of motion vectors {$v_k$} for multihypothesis motion compensation of the specific sub-coding unit SubCU($t_0$) by performing motion estimation. In addition, in Step 914, the preprocessing module can further utilize a linear combination of a plurality of pixel values {$\Psi_r$} of sub-coding/coding units associated to the plurality of motion vectors {$v_k$} as the predicted pixel value $\Psi_p$ of the specific sub-coding unit SubCU($t_0$). For example, in a situation where the specific predicted pixel having the predicted pixel value $\Psi_p$ is located at the position x (e.g. a vector indicating the position, such as a two dimensional vector on the image plane of the current frame F($t_0$)), the predicted pixel value $\Psi_p$ can be rewritten as $\Psi_p(x)$, and the predicted pixel value $\Psi_p(x)$ can be express as follows:

$$\Psi_p(x) = \Sigma_{k \in K}(h_k(x)\Psi_r(x+v_k)) + h_0(x)\Psi_r(x+v_0);$$

where the index k may vary within the set K, with the notation $h_k(x)$ representing the weighted parameter associated to the index k, and the estimated motion vector $v_0$ is the motion vector to be estimated during motion estimation, with the notation $h_0(x)$ representing the weighted parameter associated to the suffix 0 of the estimated motion vector $v_0$.

During the rate-distortion optimization mentioned above, the preprocessing module may calculate a distortion indicator $I_{DIST}$, where the distortion indicator typically represents the difference between the original partial image of the specific sub-coding unit SubCU($t_0$) and the reconstructed partial image of the specific sub-coding unit SubCU($t_0$) after multi-hypothesis prediction with respect to a possible status (e.g. the length and the angle) of the estimated motion vector $v_0$. For example, the distortion indicator $I_{DIST}$ and the associated motion vector difference MVD can be express as follows:

$$I_{DIST} = |\Psi_{REAL}(x) - \Sigma_{k \in K}(h_k(x)\Psi_r(x+v_k)) - h_0(x)\Psi_r(x+v_0)|;$$
and $$MVD = v_0 - MVP;$$

where the notation $\Psi_{REAL}(x)$ represents the real pixel value of the current pixel under consideration, and the notation MVP represents the motion vector predictor. More particularly, within the above equations, the upper one for the distortion indicator $I_{DIST}$ can be rearranged as follows:

$$I_{DIST} = |\Psi_{REAL}(x) - \Sigma_{k \in K}(h_k(x)\Psi_r(x+v_k)) - h_0(x)\Psi_r(x+v_0)|$$
$$= |(\Psi_{REAL}(x) - \Sigma_{k \in K}(h_k(x)\Psi_r(x+v_k))) - h_0(x)\Psi_r(x+v_0)|$$
$$= h_0(x)|(\Psi_{REAL}(x) - \Sigma_{k \in K}(h_k(x)\Psi_r(x+v_k)))/h_0(x) - \Psi_r(x+v_0)|$$
$$= h_0(x)|\Gamma_{REAL}(x) - \Psi_r(x+v_0)|;$$

where $\Gamma_{REAL}(x) = (\Psi_{REAL}(x) - \Sigma_{k \in K}(h_k(x)\Psi_r(x+v_k)))/h_0(x)$. In the above equation, the term $\Gamma_{REAL}(x)$ and the term ($\Psi_{REAL}(x) - \Sigma_{k \in K}(h_k(x)\Psi_r(x+v_k))$) are independent of the estimated motion vector $v_0$, and therefore, at least one of these terms, such as the term $\Gamma_{REAL}(x)$ and/or the term ($\Psi_{REAL}(x) - \Sigma_{k \in K}(h_k(x)\Psi_r(x+v_k))$), can be calculated in advance and temporarily stored for being accessed in order to increase the processing speed of the apparatus 100 according to this embodiment.

According to this embodiment, the preprocessing module of this embodiment can optimize the estimated motion vector $v_0$ by finding the best status corresponding to the minimum Lagrange function of the distortion indicator $I_{DIST}$ and the bits used to encode the motion vector difference MVD, among other possible statuses of the estimated motion vector $v_0$. Thus, the linear combination of this embodiment can be the weighted summation $\Sigma_{k \in K}(h_k(x)\Psi_r(x+v_k)) + h_0(x)\Psi_r(x+v_0)$ with the estimated motion vector $v_0$ having been obtained, and the preprocessing module can utilize the weighted summation $\Sigma_{k \in K}(h_k(x)\Psi_r(x+v_k)) + h_0(x)\Psi_r(x+v_0)$ as the predicted pixel value $\Psi_p$ of the specific sub-coding unit SubCU($t_0$). Similar descriptions are not repeated in detail for this embodiment.

Figure 9:
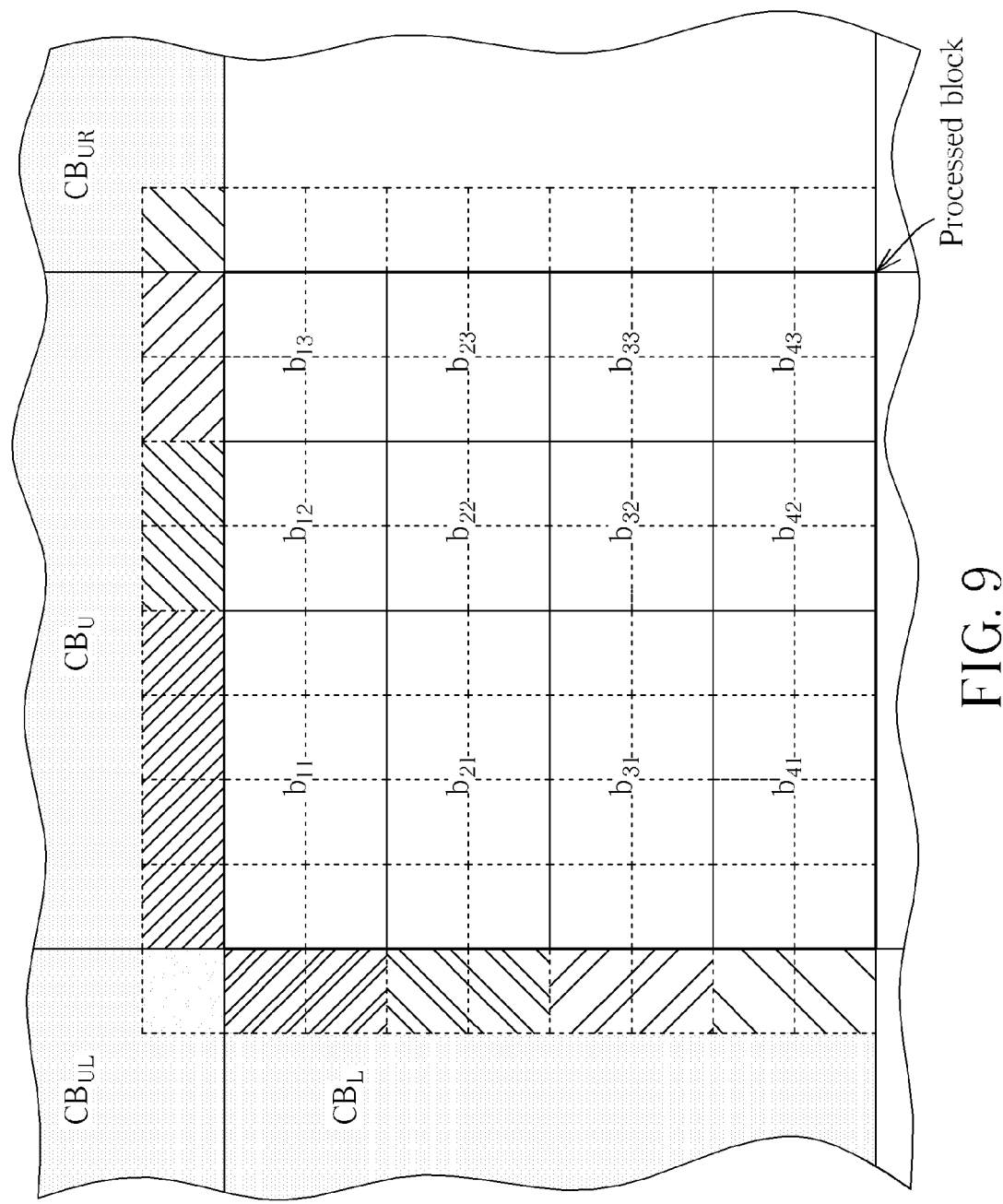
FIG. 9 illustrates some implementation details involved with the method shown in FIG. 2 according to an embodiment of the present invention.

FIG. 9 illustrates some implementation details involved with the method 910 shown in FIG. 2 according to an embodiment of the present invention, where the preprocessing module can perform variable partition multihypothesis prediction, and more particularly, can adaptively determine the partition of the coding unit CU($t_0$) in response to the partition of at least one neighboring coding unit. For better comprehension, the coded blocks $CB_L$, $CB_{UL}$, $CB_U$, and $CB_{UR}$ can be the same as those shown in FIG. 3, respectively.

According to this embodiment, in Step 912, the preprocessing module can divide the coding unit CU($t_0$) such as the block under processing (labeled "Processed block" in FIG. 9) into the plurality of sub-coding units {SubCU($t_0$)} based upon the partition of at least one neighboring coding unit (e.g. one or more of the coded blocks $CB_L$, $CB_{UL}$, $CB_U$, and $CB_{UR}$). For example, the plurality of sub-coding units {SubCU($t_0$)} may comprise the sub-blocks $b_{11}$, $b_{12}$, $b_{13}$, $b_{21}$, $b_{22}$, $b_{23}$, $b_{31}$, $b_{32}$, $b_{33}$, $b_{41}$, $b_{42}$, and $b_{43}$, whose sizes correspond to the partition of the neighboring coded blocks such as the coded blocks $CB_L$, and $CB_U$, and more particularly, the associated sizes of some sub-blocks of these neighboring coded blocks. In the situation shown in FIG. 9, the sub-blocks of these neighboring coded blocks are those adjacent to the block under processing, where the sub-blocks are shaded and illustrated with different patterns, respectively. Similar descriptions are not repeated in detail for this embodiment.

Figure 10:
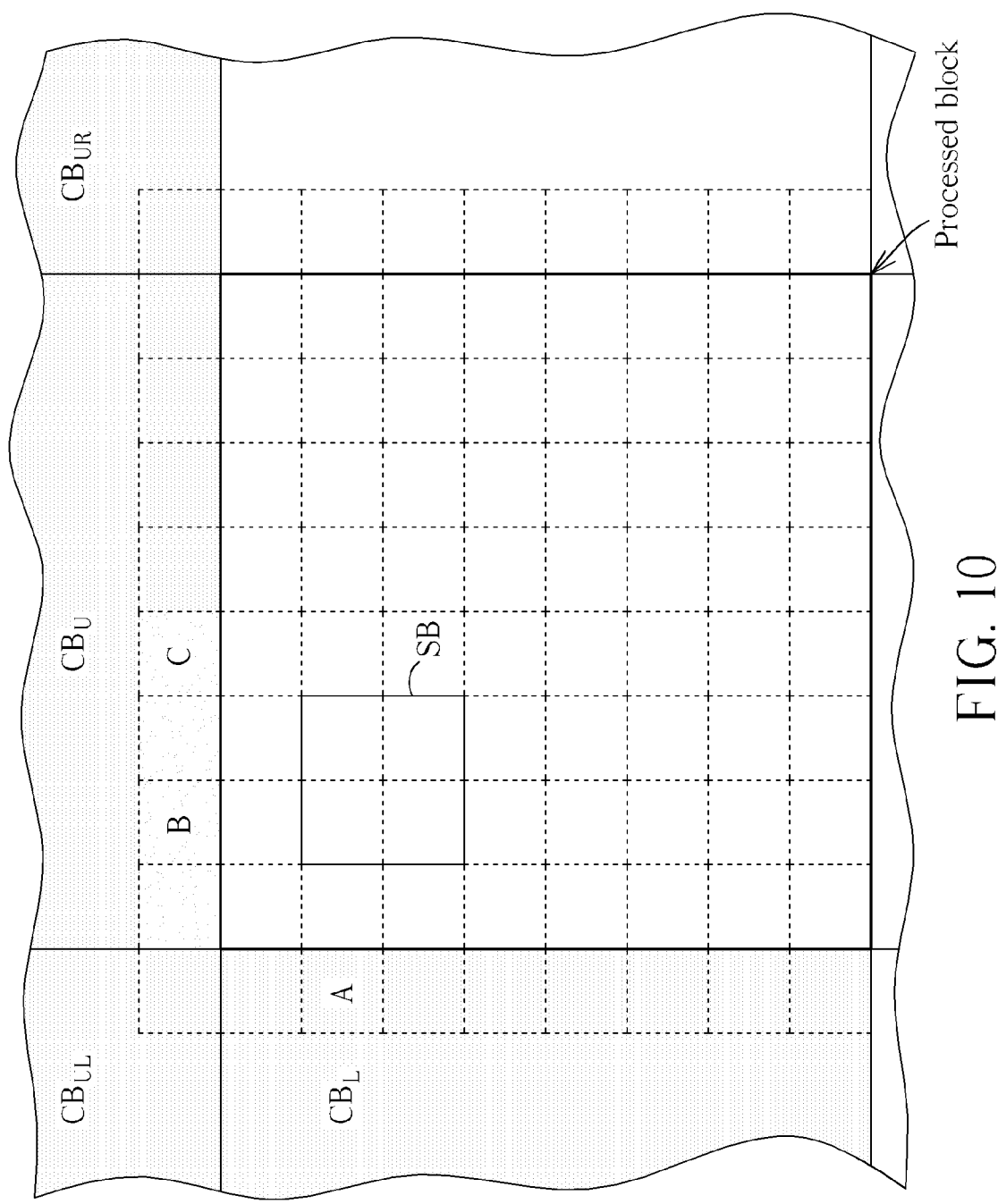
FIG. 10 illustrates some implementation details involved with the method shown in FIG. 2 according to another embodiment of the present invention.

FIG. 10 illustrates some implementation details involved with the method 910 shown in FIG. 2 according to another embodiment of the present invention, where the preprocessing module can adaptively determine the blending weights (e.g. the weighted parameters {$h_k(i, x)$} disclosed above) according to the contents of at least one neighboring coding unit. For better comprehension, the coded blocks $CB_L$, $CB_{UL}$, $CB_U$, and $CB_{UR}$ can be the same as those shown in FIG. 3, respectively. In addition, the sub-block SB is illustrated as an example of the specific sub-coding unit SubCU($t_0$).

For example, the motion vectors {$v_k$} may comprise the motion vectors $v_A$, $v_B$, and $v_C$ of the sub-coding units A, B, and C, where the sub-coding unit A belongs to the left coded block $CB_L$, and the sub-coding units B and C belong to the upper coded block $CB_U$. During the processing of generating the weighted summation $\Sigma_{k \in K}(h_k(i, x)\Psi_r(x+v_k))$ (e.g. the weighted summation Weighted_Sum($\Psi_r(v_A)$, $\Psi_r(v_B)$, $\Psi_r(v_C)$) in the situation shown in FIG. 10), when the sub-coding units B and C are texture sub-coding units (e.g. texture sub-blocks) and the sub-coding unit A is a non-texture sub-coding unit (e.g. a non-texture sub-block), the preprocessing module can adaptively determine the weighted parameters $h_B(i, x)$ and $h_C(i, x)$ associated to the motion vectors $v_B$ and $v_C$ of the sub-coding units B and C to be greater than the weighted parameter $h_A(i, x)$ associated to the motion vector $v_A$ of the sub-coding unit A, respectively. Similar descriptions are not repeated in detail for this embodiment.

Figure 11:
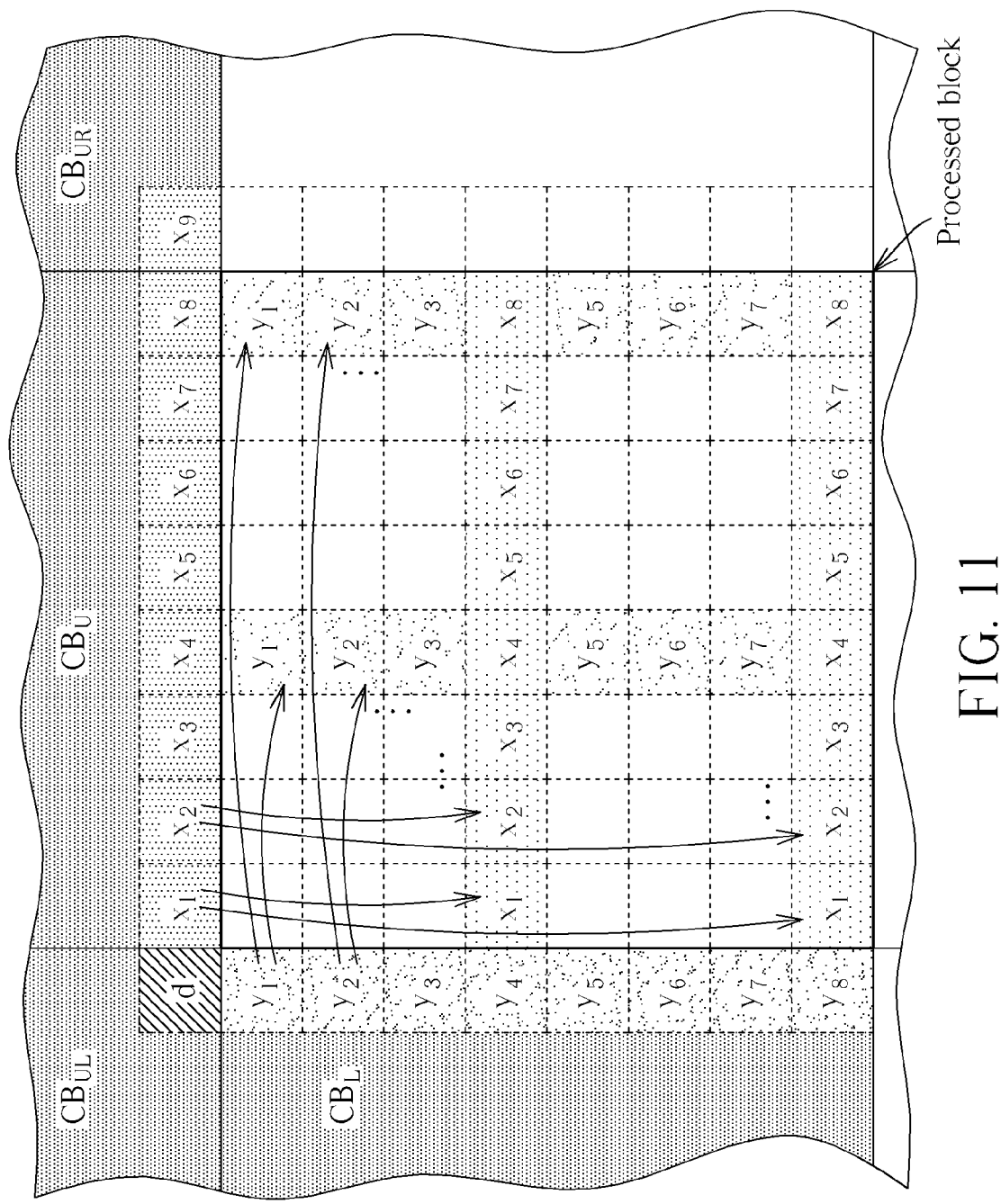
FIG. 11 illustrates some implementation details involved with the method shown in FIG. 2 according to an embodiment of the present invention.

FIG. 11 illustrates some implementation details involved with the method 910 shown in FIG. 2 according to an embodiment of the present invention. According to this embodiment, the preprocessing module still divides the coding unit CU($t_0$) (e.g. the coding unit under consideration) into the plurality of sub-coding units such as the sub-coding units {SubCU($t_0$)} and performs prediction on each of the sub-coding units {SubCU($t_0$)} in Step 912. However, when/before obtaining the motion information such as the motion vectors $\{v_k\}$ disclosed above, the preprocessing module can designate a motion vector (e.g. a reference motion vector) for each sub-coding unit so it can be later referenced by other sub-coding unit(s)/coding unit(s). The rule for motion vector designation can be arbitrary as it just needs to be agreed and complied by both the encoders and decoders. Some predetermined rule for motion vector designation include motion vector predictor defined in H.264, motion vector prediction defined in H.264 but with motion vector scaling, padding from the left block, padding from the upper block, and padding from left or upper block. According to an embodiment of padding from left or upper block, the preprocessing module designates a motion vector utilizing the motion vector of a sub-coding unit of another coding unit (except for the coding unit $CU(t_0)$ under consideration), such as a coded sub-coding unit of an adjacent coding unit $CU_{ADJ}(t_0)$ that is adjacent to the coding unit $CU(t_0)$. More particularly, with regard to the specific sub-coding unit $SubCU(t_0)$, the sub-coding unit of the other coding unit (e.g. the coding unit $CU_{ADJ}(t_0)$) is the closest sub-coding unit within the other coding unit, and the preprocessing module can utilize the motion vector of the closest sub-coding unit within the other coding unit (e.g. the coding unit $CU_{ADJ}(t_0)$) as the motion vector designated for the specific sub-coding unit $SubCU(t_0)$. The motion vector designated to a coding unit or a sub-coding unit is mainly used as a reference motion vector for other coding units or sub-coding units, where it is not necessary to be used for motion prediction.

As shown in FIG. 11, with regard to the coding unit $CU(t_0)$ such as the block under processing (labeled "Processed block" in FIG. 11), the adjacent coding units $\{CU_{ADJ}(t_0)\}$ that are involved in this embodiment may comprise at least a portion of the left coded block $CB_L$, the upper coded block $CB_U$, the upper right coded block $CB_{UR}$, and the upper left coded block $CB_{UL}$, where the sub-coding units in these coded blocks $CB_L$, $CB_U$, $CB_{UR}$, and $CB_{UL}$ can be regarded as sub-blocks. For better comprehension, the motion vectors $y_1$, $y_2$, $y_3$, $y_4$, $y_5$, $y_6$, $y_7$, and $y_8$ of the rightmost column of sub-coding units within the left coded block $CB_L$ are labeled on the rightmost column of sub-coding units, respectively. Similarly, the motion vectors $x_1$, $x_2$, $x_3$, $x_4$, $x_5$, $x_6$, $x_7$, and $x_8$ of the bottommost row of sub-coding units within the upper coded block $CB_U$ are labeled on the bottommost row of sub-coding units, respectively. In addition, the motion vector d of the bottom right sub-coding unit within the upper left coded block $CB_{UL}$ and the motion vector $x_9$ of the bottom left sub-coding unit within the upper right coded block $CB_{UR}$ are labeled thereon, respectively.

According to this embodiment, the preprocessing module receives the coding unit $CU(t_0)$ comprising a plurality of sub-coding units $\{SubCU(t_0)\}$ and parses the data of the coding unit $CU(t_0)$, and designates a reference motion vector of the specific sub-coding unit $SubCU(t_0)$ of the sub-coding units $\{SubCU(t_0)\}$ according to a predetermined rule, where the reference motion vector is utilized for reference by at least one other sub-coding unit, and is not utilized for motion vector prediction of the specific sub-coding unit $SubCU(t_0)$. With reference motion vectors being utilizing for reference, the preprocessing module can operate rapidly, having no need to wait for completion of any complicated calculation regarding the real motion vector of the specific sub-coding unit $SubCU(t_0)$. In practice, the preprocessing module can designate this motion vector (i.e. the reference motion vector mentioned above) to be a motion vector of at least one portion of an adjacent coding unit. More particularly, the at least one portion of the adjacent coding unit can be a portion that is most close to the specific sub-coding unit within the neighboring coding unit.

For example, suppose that the specific sub-coding unit $SubCU(t_0)$ represents the $j^{th}$ sub-block of a certain row of sub-blocks in the block under processing (e.g. the processed block shown in FIG. 11), where j may vary from 1 to 8. In a first designation rule such as "vertical designation", the preprocessing module can utilize the motion vector $x_j$ of the closest sub-coding unit within the upper coded block $CB_U$ as the reference motion vector of the specific sub-coding unit $SubCU(t_0)$.

In another example, suppose that the specific sub-coding unit $SubCU(t_0)$ represents the $j^{th}$ sub-block of a certain column of sub-blocks in the block under processing (e.g. the processed block shown in FIG. 11), where j may vary from 1 to 8. In a second designation rule such as "horizontal designation", the preprocessing module utilizes the motion vector $y_j$ of the closest sub-coding unit within the left coded block $CB_L$ as the reference motion vector of the specific sub-coding unit $SubCU(t_0)$.

In another example, a third designation rule such as "hybrid designation" can be selected for determining the reference motion vector. Suppose that the specific sub-coding unit $SubCU(t_0)$ represents the $j^{th}$ sub-block of the fourth/eighth row of sub-blocks in the block under processing (labeled "Processed block" in FIG. 11), where j may vary from 1 to 8. Referring to FIG. 11, as illustrated with the arrow pointing to the $j^{th}$ sub-block of the fourth/eighth row of sub-blocks, the preprocessing module utilizes the motion vector $x_j$ of the closest sub-coding unit within the upper coded block $CB_U$ as the reference motion vector of the specific sub-coding unit $SubCU(t_0)$. In addition, suppose that the specific sub-coding unit $SubCU(t_0)$ represents the $j^{th}$ sub-block of the fourth/eighth column of sub-blocks in the block under processing (labeled "Processed block" in FIG. 11), where j may vary from 1 to 7 except for 4. Referring to FIG. 11, as illustrated with the arrow pointing to the $j^{th}$ sub-block of the fourth/eighth column of sub-blocks, the preprocessing module utilizes the motion vector $y_j$ of the closest sub-coding unit within the left coded block $CB_L$ as the reference motion vector of the specific sub-coding unit $SubCU(t_0)$. In this embodiment, the reference motion vectors of the remaining sub-coding units within the coding unit $CU(t_0)$ can be obtained by utilizing the same or similar method in any of the embodiments/variations disclosed above. Similar descriptions are not repeated in detail for this embodiment.

Please note that, in some embodiments such as some variations of the above embodiment, the preprocessing module can control the operations disclosed above by utilizing a flag, and more particularly, by explicitly sending a flag. For example, an encoder implemented according to one of these embodiments may send a flag indicating whether the designation rule to be applied is one of "vertical designation" and "horizontal designation" (and even "hybrid designation"), so by receiving a bitstream carrying the flag, an associated decoder can be notified of the designation rule to be applied.

In addition, in some embodiments, various motion vector designation methods disclosed above (e.g. "vertical designation" and "horizontal designation", and even "hybrid designation") can be utilized for performing local motion vector derivation. For example, in a situation where "vertical designation" is applied, the motion vectors of each row of sub-coding units are derived from the corresponding locations within the upper coded block $CB_U$ (e.g. the closest sub-coding unit within the upper coded block $CB_U$), respectively.

It is an advantage of the present invention that the present invention methods and apparatuses can properly perform localized multihypothesis prediction, and more particularly, can properly perform multihypothesis motion compensation on the sub-coding units of the coding unit under consideration with ease. As a result of utilizing the present invention method and apparatus, both the motion vector prediction operations and the multihypothesis motion compensation operations can be performed without introducing any related art problem such as low coding efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing localized multihypothesis prediction during video coding of a coding unit, the method comprising:
   processing the coding unit, wherein the step of processing the coding unit further comprises:
   obtaining at least two sets of motion information from one or more coded units for multihypothesis motion compensation of the coding unit, wherein the one or more coded units comprise at least one neighboring coded unit, and the motion information of the at least one neighboring coded unit is used as motion information of the coding unit and the motion information comprises a first motion vector and a second motion vector corresponding to other coding units within a current frame where the coding unit is located, wherein the one or more coded units are motion-compensated; and
   utilizing a linear combination of a plurality of pixel values derived from the at least two sets of motion information as a predicted pixel value of the coding unit.

2. The method of claim 1, wherein the step of utilizing the linear combination of the plurality of pixel values as the predicted pixel value of the coding unit further comprises:
   utilizing a weighted summation of the plurality of pixel values as the predicted pixel value of the coding unit.

3. The method of claim 2, wherein the step of utilizing the linear combination of the plurality of pixel values as the predicted pixel value of the coding unit further comprises:
   performing optimum Wiener filtering on the plurality of pixel values with respect to a real pixel value of a current pixel, in order to adjust respective weighted parameters for the plurality of pixel values and to generate the weighted summation.

4. The method of claim 2, wherein the step of utilizing the linear combination of the plurality of pixel values as the predicted pixel value of the coding unit further comprises:
   determining respective weighted parameters for the plurality of pixel values according to contents of at least one neighboring coding unit, in order to generate the weighted summation.

5. The method of claim 2, wherein the step of utilizing the linear combination of the plurality of pixel value as the predicted pixel value of the coding unit further comprises:
   determining respective weighted parameters for the plurality of pixel values according to contents of the one or more coded units, in order to generate the weighted summation.

6. The method of claim 2, wherein the step of utilizing the linear combination of the plurality of pixel value as the predicted pixel value of the coding unit further comprises:
   determining respective weighted parameters for the plurality of pixel values by offline training, in order to generate the weighted summation.

7. The method of claim 2, wherein the step of utilizing the linear combination of the plurality of pixel value as the predicted pixel value of the coding unit further comprises:
   determining respective weighted parameters for the plurality of pixel values by online training, in order to generate the weighted summation.

8. The method of claim 1, wherein each set of the motion information comprises at least one or a combination of motion vector, reference frame index, and prediction direction.

9. The method of claim 8, wherein the at least two sets of motion information are derived from a single coded unit.

10. The method of claim 8, wherein the at least two sets of motion information are derived from different coded units.

11. The method of claim 1, wherein the step of processing the coding unit further comprises:
    screening a set of motion vectors by discarding at least one extreme motion vector, in order to select a remaining portion of the set of motion vectors as the motion information of the one or more coded units.

12. The method of claim 1, wherein the step of processing the coding unit further comprises:
    dynamically selecting a set of motion vectors from a plurality of sets of motion vectors as the motion information, and utilizing the selected set of motion vectors to derive the predicted pixel value of the coding unit.

13. The method of claim 12, wherein the plurality of sets of motion vectors comprises a first set of motion vectors that are temporal motion vectors, and further comprises a second set of motion vectors that are spatial motion vectors.

14. The method of claim 1, wherein the step of processing the coding unit further comprises:
    dynamically selecting a set of motion vectors from a plurality of sets of motion vectors as the motion information based on an explicit flag.

15. The method of claim 1, wherein the motion information of the coding unit further comprises a third motion vector corresponding to another coding unit located within another frame that is not the current frame where the coding unit is located.

16. An apparatus for performing localized multihypothesis prediction during video coding of a coding unit, the apparatus comprising:
    a processing circuit arranged to perform video coding on the coding unit,
    wherein the processing circuit comprises:
    a preprocessing module arranged to process the coding unit, wherein the preprocessing module obtains at least two sets of motion information from one or more coded units for multihypothesis motion compensation of the coding unit, and performs multihypothesis motion compensation on the coding unit according to the at least two sets of motion information, wherein the one or more coded units comprise at least one neighboring coded unit, the motion information of the at least one neighboring coded unit is used as motion information of the coding unit and the motion information comprises a first motion vector and a second motion vector corresponding to other coding units within a current frame where the coding unit is located, the one or more coded units are motion-compensated, and the preprocessing module utilizes a linear combination of a plurality of pixel values derived from the at least two sets of motion information as a predicted pixel value of the coding unit; and at least one coding module arranged to perform video coding on the coding unit based upon the multihypothesis motion compensation performed by the preprocessing module.

17. The apparatus of claim 16, wherein the preprocessing module utilizes a weighted summation of the plurality of pixel values as the predicted pixel value of the coding unit.

18. The apparatus of claim 17, wherein the preprocessing module performs optimum Wiener filtering on the plurality of pixel values with respect to a real pixel value of a current pixel, in order to adjust respective weighted parameters for the plurality of pixel values and to generate the weighted summation.

19. The apparatus of claim 17, wherein the preprocessing module determines respective weighted parameters for the plurality of pixel values according to contents of at least one neighboring coding unit, in order to generate the weighted summation.

20. The apparatus of claim 17, wherein the preprocessing module determines respective weighted parameters for the plurality of pixel values according to contents of the one or more coded units, in order to generate the weighted summation.

21. The apparatus of claim 16, wherein the preprocessing module screens a set of motion vectors by discarding at least one extreme motion vector, in order to select a remaining portion of the set of motion vectors as the motion information.

22. The apparatus of claim 16, wherein the preprocessing module dynamically selects a set of motion vectors from a plurality of sets of motion vectors as the motion information, and utilizes the selected set of motion vectors to derive the predicted pixel value of the coding unit.

23. The apparatus of claim 16, wherein each set of the motion information comprises at least one or a combination of motion vector, reference frame index, and prediction direction.

24. The apparatus of claim 23, wherein the at least two sets of motion information are derived from a single coded unit.

25. The apparatus of claim 23, wherein the at least two sets of motion information are derived from different coded units.

26. The apparatus of claim 16, wherein the motion information of the coding unit further comprises a third motion vector corresponding to another coding unit located within another frame that is not the current frame where the coding unit is located

* * * * *